US009926651B2

(12) United States Patent
Khokar

(10) Patent No.: US 9,926,651 B2
(45) Date of Patent: Mar. 27, 2018

(54) METHOD AND MEANS FOR WEAVING, 3D FABRIC ITEMS THEREOF AND THEIR USE

(71) Applicant: BITEAM AB, Bromma (SE)

(72) Inventor: Nandan Khokar, Göteborg (SE)

(73) Assignee: BITEAM AB, Bromma (SE)

( * ) Notice: Subject to any disclaimer, the term of this patent is extended or adjusted under 35 U.S.C. 154(b) by 0 days.

(21) Appl. No.: 14/916,460

(22) PCT Filed: Sep. 4, 2013

(86) PCT No.: PCT/EP2013/068264
§ 371 (c)(1),
(2) Date: Mar. 3, 2016

(87) PCT Pub. No.: WO2015/032426
PCT Pub. Date: Mar. 12, 2015

(65) Prior Publication Data
US 2016/0201234 A1 Jul. 14, 2016

(51) Int. Cl.
*D03D 13/00* (2006.01)
*D03D 25/00* (2006.01)
(Continued)

(52) U.S. Cl.
CPC ............ *D03D 1/00* (2013.01); *D03C 9/02* (2013.01); *D03C 13/00* (2013.01); *D03D 3/06* (2013.01);
(Continued)

(58) Field of Classification Search
CPC . B29C 70/24; B29C 66/43441; B29C 66/721; B29C 70/222; B29C 65/5028;
(Continued)

(56) References Cited

U.S. PATENT DOCUMENTS

| 4,201,815 A | * | 5/1980 | Weiland | ................. B64C 27/33 428/105 |
| 4,331,495 A | * | 5/1982 | Lackman | ............. B29C 70/865 112/423 |

(Continued)

FOREIGN PATENT DOCUMENTS

CN 102926102 A 2/2013
EP 1 365 051 A2 11/2003
(Continued)

OTHER PUBLICATIONS

International Search Report (PCT/ISA/210) dated May 16, 2014, by the European Patent Office as the International Searching Authority for International Application No. PCT/EP2013/068264.
(Continued)

*Primary Examiner* — Bobby Muromoto, Jr.
(74) *Attorney, Agent, or Firm* — Buchanan Ingersoll & Rooney P.C.

(57) ABSTRACT

An add-on weaving method, a device based on this method, 3D fabric items producible by this method and device, and composite materials reinforced with such 3D fabric items. The 3D fabric items are produced directly by the add-on weaving process using Complementary Fabric, warp yarns and weft yarns. The interacting woven fabric produced by interlacing the warp and weft yarns is simultaneously integrated with the Complementary Fabric used. The Complementary Fabric and interacting woven fabric integrate in mutual through-thickness directions at their intersecting planes and create directly 3D fabric items which are useful for manufacturing delamination resistant and high-performance composite materials.

37 Claims, 20 Drawing Sheets

(51) Int. Cl.
| | |
|---|---|
| *D03D 1/00* | (2006.01) |
| *D03C 9/02* | (2006.01) |
| *D03C 13/00* | (2006.01) |
| *D03D 3/06* | (2006.01) |
| *D03D 3/08* | (2006.01) |
| *D03D 15/00* | (2006.01) |
| *D03D 41/00* | (2006.01) |

(52) U.S. Cl.
CPC .............. *D03D 3/08* (2013.01); *D03D 13/00* (2013.01); *D03D 13/002* (2013.01); *D03D 15/00* (2013.01); *D03D 25/005* (2013.01); *D03D 41/004* (2013.01); *D10B 2505/02* (2013.01)

(58) Field of Classification Search
CPC ............ B29C 66/43461; B29C 66/729; B29C 70/207; B29C 70/228; D03D 25/005; D03D 11/00; D03D 41/004
See application file for complete search history.

(56) References Cited

U.S. PATENT DOCUMENTS

| | | | | |
|---|---|---|---|---|
| 4,379,798 | A * | 4/1983 | Palmer | B29C 70/24 428/113 |
| 4,671,470 | A * | 6/1987 | Jonas | B29C 66/54 244/119 |
| 4,686,134 | A * | 8/1987 | Ono | B29C 70/207 428/105 |
| 4,715,560 | A * | 12/1987 | Loyek | B29C 70/24 244/117 R |
| 4,779,429 | A * | 10/1988 | Banos | B29C 70/24 66/190 |
| 4,786,541 | A * | 11/1988 | Nishimura | B29C 70/228 428/102 |
| 5,021,281 | A * | 6/1991 | Bompard | B29C 70/24 139/384 R |
| 5,121,530 | A * | 6/1992 | Sakatani | B29C 70/222 28/100 |
| 5,236,020 | A * | 8/1993 | Sakatani | B29C 70/24 139/175 |
| 5,343,897 | A * | 9/1994 | Sakatani | B29C 70/24 139/175 |
| 5,429,853 | A * | 7/1995 | Darrieux | B29C 70/24 112/440 |
| 5,783,279 | A * | 7/1998 | Edgson | B29B 11/16 139/11 |
| 6,019,138 | A * | 2/2000 | Malek | D03D 25/005 139/1 R |
| 6,103,337 | A * | 8/2000 | Burgess | B29B 11/16 156/92 |
| 8,127,802 | B2 * | 3/2012 | Ouellette | B29B 11/16 139/11 |
| 2002/0081416 | A1 * | 6/2002 | Goering | D03D 25/005 428/121 |
| 2002/0192450 | A1 * | 12/2002 | Schmidt | B29C 70/24 428/299.1 |
| 2003/0056847 | A1 * | 3/2003 | Schmidt | B29C 70/24 139/383 R |
| 2006/0121809 | A1 * | 6/2006 | Goering | B29B 11/16 442/246 |
| 2008/0261474 | A1 * | 10/2008 | Goering | B29C 70/222 442/195 |
| 2009/0163100 | A1 * | 6/2009 | Goering | B29B 11/16 442/205 |
| 2009/0247034 | A1 * | 10/2009 | Goering | B29C 70/222 442/206 |
| 2009/0311462 | A1 * | 12/2009 | Goering | B29B 11/16 428/99 |
| 2010/0105268 | A1 * | 4/2010 | Ouellette | B29B 11/16 442/203 |
| 2010/0105269 | A1 * | 4/2010 | Goering | B29C 70/24 442/205 |
| 2010/0167007 | A1 * | 7/2010 | Goering | B29B 11/16 428/124 |
| 2013/0089429 | A1 | 4/2013 | Nunez et al. | |
| 2013/0333793 | A1 | 12/2013 | Dambrine et al. | |

FOREIGN PATENT DOCUMENTS

| | | |
|---|---|---|
| FR | 2 970 481 A1 | 7/2012 |
| WO | WO91/06421 | 5/1991 |
| WO | WO 98/39508 A1 | 9/1998 |

OTHER PUBLICATIONS

Cornelia Kowtsch et al.: "2D-Gewebe-Strukturen" In: "Textile Werkstoffe für den Leichtbau", Dec. 31, 2011 (Dec. 31, 2011). Springer, Berlin, ISBN: 978-3-64-217991-4, pp. 201-202, DOI:10.1007/978-3-642-17992-1, p. 201-p. 202; figure 5.25(b), XP055116851.

Office Action dated Jan. 10, 2017, by the Chinese Patent Office in corresponding Chinese Patent Application No. 201380079332.7, and a partial English Translation of the Office Action. (29 pages).

* cited by examiner

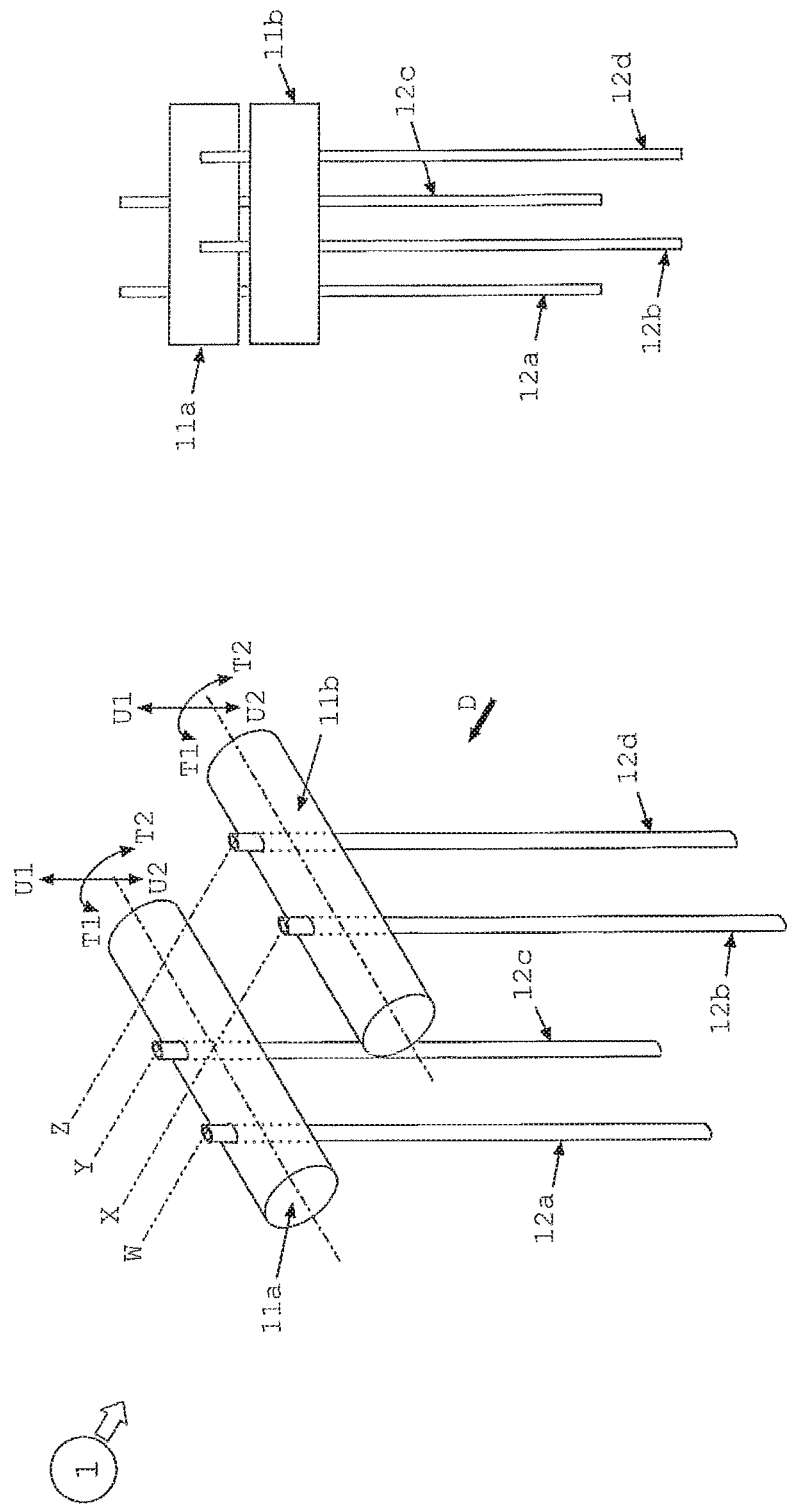

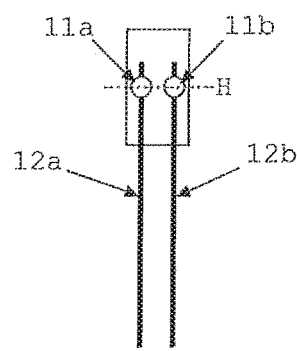
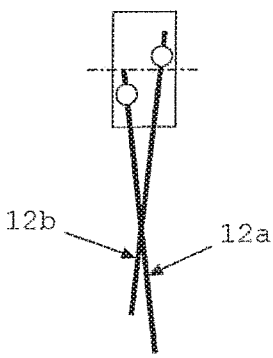
Fig. 5a      Fig. 5b
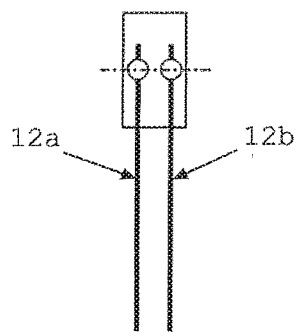
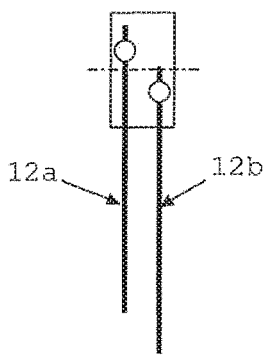
Fig. 5c      Fig. 5d
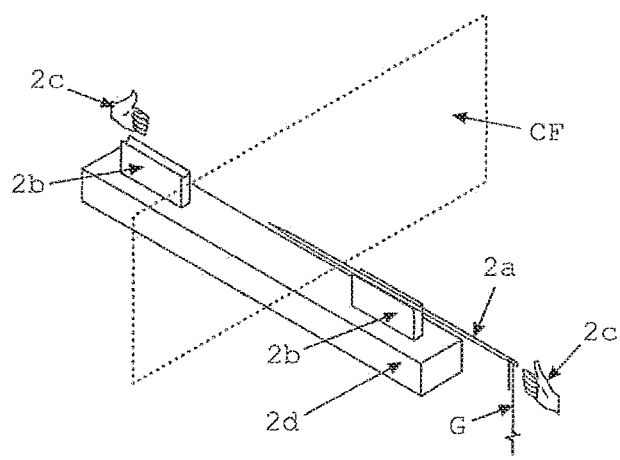
Fig. 6

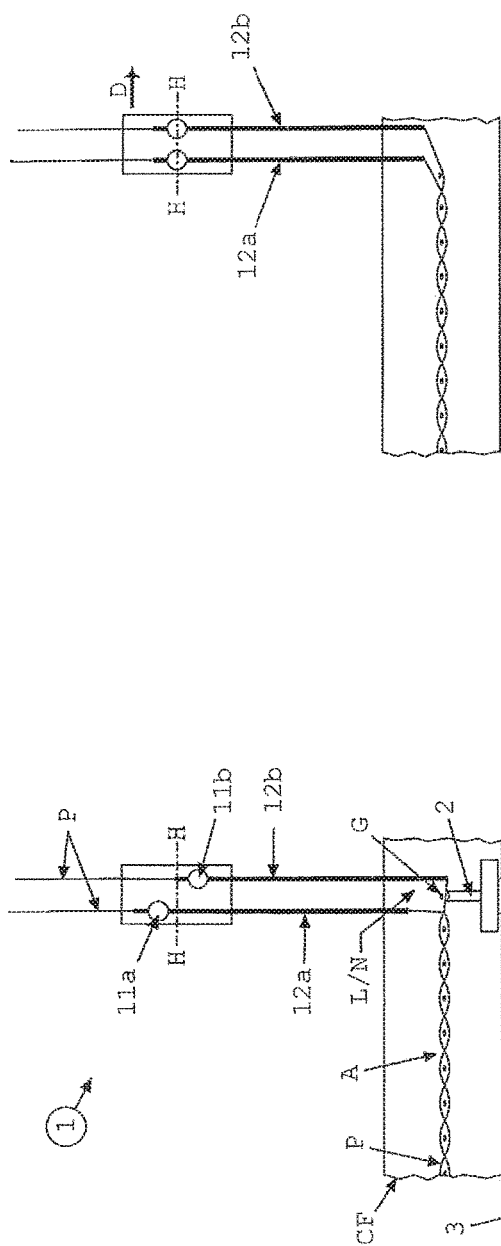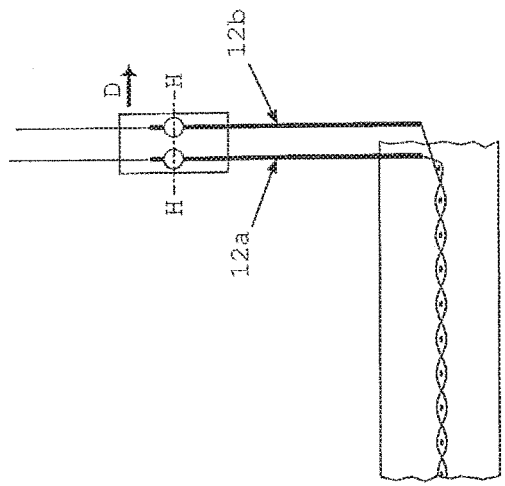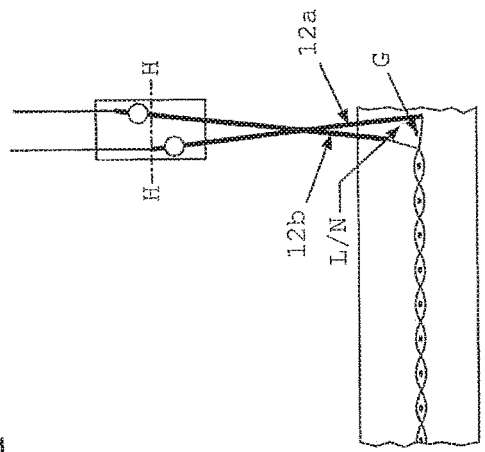

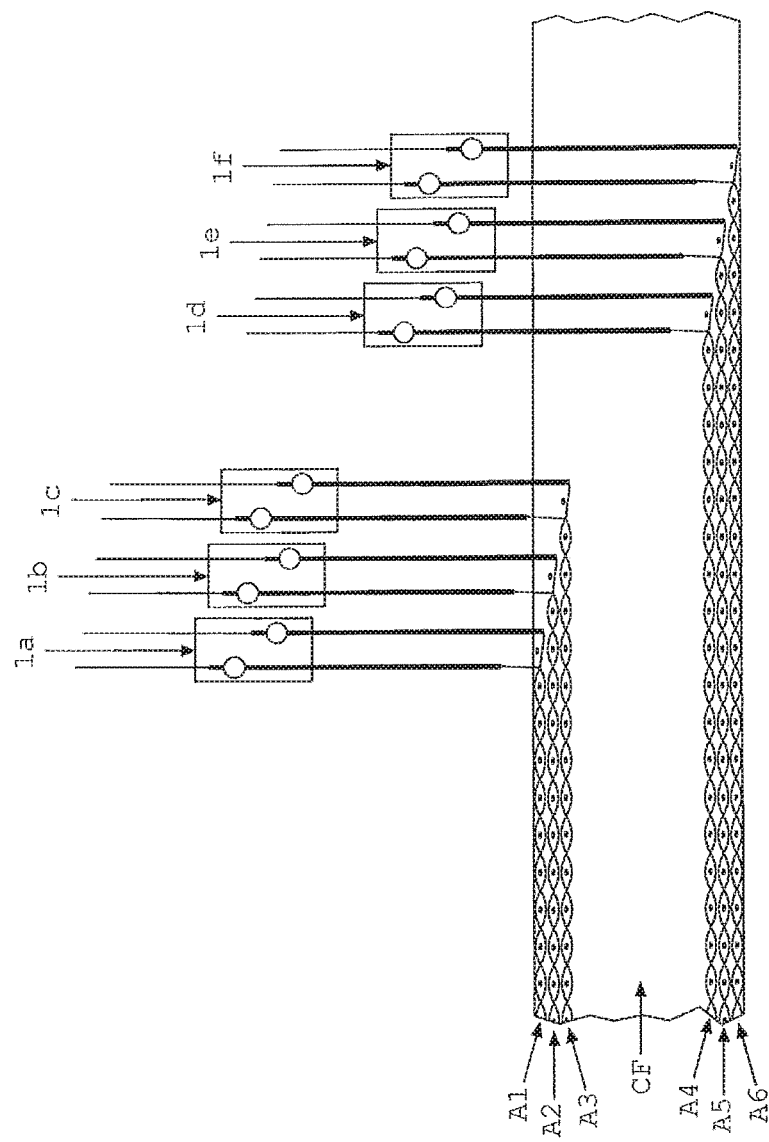

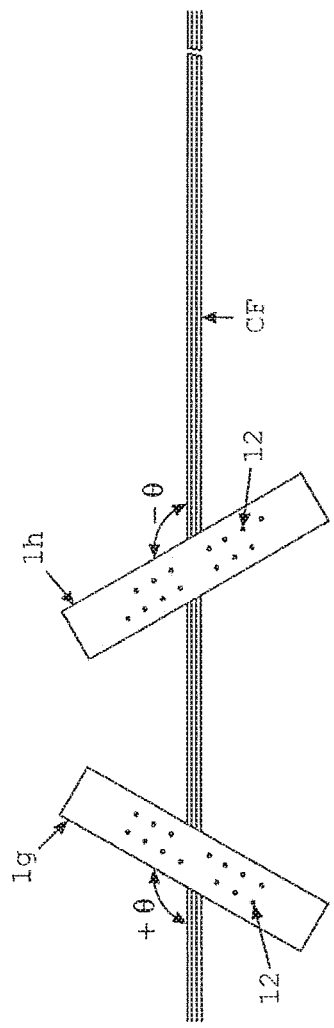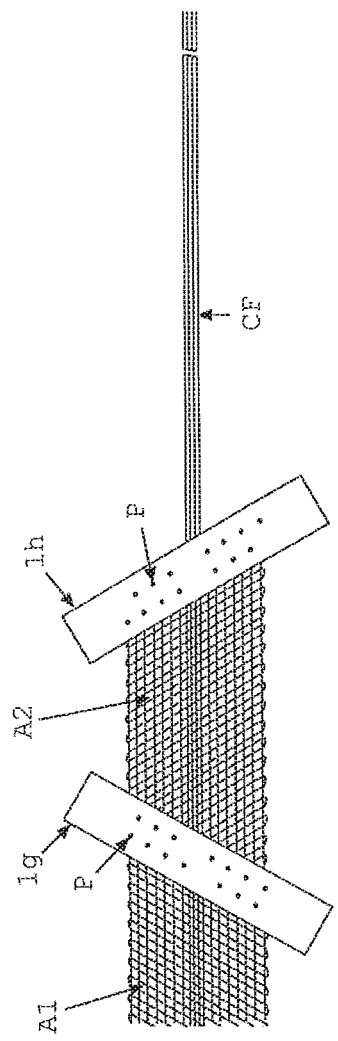
Fig. 10a
Fig. 10b

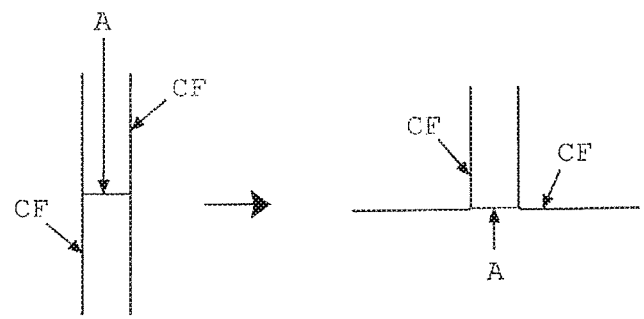
Fig. 14-1
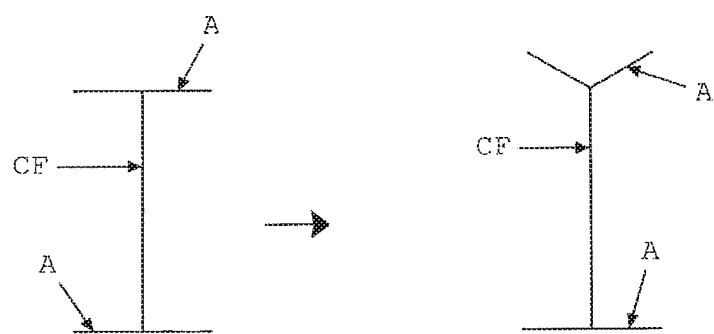
Fig. 14-o

METHOD AND MEANS FOR WEAVING, 3D FABRIC ITEMS THEREOF AND THEIR USE

TECHNICAL FIELD

The present inventions in general belong to the field of textiles. In particular they concern a method and means for weaving, 3D fabric items thereof, and composite materials reinforced with such 3D fabric items.

BACKGROUND

A number of fabric-forming methods have been developed over the years to produce profiled cross-section beams, such as T, L, Pi, H, I and U, either directly or indirectly, for manufacturing 3D (three-dimensional) fabric reinforced composite materials. Such 3D fabric reinforcements, called profiled beam-like pre-forms, are intended for primary load-bearing structural applications. These pre-forms, and other new types to be described herein, are together henceforth called 3D fabric items. The 3D fabric items which are like profiled beams are essentially composed of two sections: (i) the 'vertical' section/s, henceforth called web/s, and (ii) the 'horizontal' section/s, henceforth called flange/s. The simplest profiled beam-like 3D fabric items are exemplified by the "T" or "L" or "+" cross-sections as each one of them have one web and one flange. Other 3D fabric items, which are unlike profiled beams, can be more complex in structure and form, besides not necessarily comprising just webs and/or flanges, or even planar/linear webs and flanges.

In the context of the inventions being disclosed herein, some of the prior arts which are considered relevant for citing to lay the background include, for example, U.S. Pat. No. 5,429,853, U.S. Pat. No. 4,331,495, U.S. Pat. No. 6,103,337, U.S. Pat. No. 4,786,541, and U.S. Pat. No. 4,379,798, which relate to indirect production of profiled beam-like 3D fabric items by either stitching/joining different fabrics or folding/bending certain section/portion of suitably created fabric, and U.S. Pat. No. 5,021,281, U.S. Pat. No. 5,783,279, U.S. Pat. No. 5,121,530, U.S. Pat. No. 4,779,429, U.S. Pat. No. 4,686,134, U.S. Pat. No. 6,019,138, and WO91/06421, which relate to direct production of profiled beam-like 3D fabric items by specially developed processes. All these known methods represent the efforts spent over the years to solve an interesting but serious set of problems, which are described below through an example to put the shortcomings of existing 3D fabric items in proper perspective.

It has not been possible so far to manufacture, for example, a simple single-wall/layer "T" cross-section beam-like 3D fabric item, comprising yarns/tows/fibers/filaments/rovings/fibrous tapes etc., which are henceforth referred to as only yarns, with e.g. the following performance and function related features in a combined way:
- A structurally integrated single-wall/layer web comprising yarns in +/−0° bias orientations relative to beam-like 3D fabric's length direction to bear shear/torsional forces;
- A structurally integrated single-wall/layer flange comprising yarns in 0°/90° orientations relative to beam-like 3D fabric's length direction to bear tensile/compressive forces;
- A mutual through-thickness connection of respective constituent yarns of the web and flange which intersect and integrate with each other at their junction to resist separation or delamination.

In other words, it has not been possible to manufacture a profiled beam-like 3D fabric item wherein its web has, for example a braided structure, and the flange has, for example a woven structure, and the web and flange are interconnected to each other mutually in their thickness directions, i.e. the planes of web and flange intersect each other at their junction. Likewise, it has not been possible to manufacture a profiled beam-like 3D fabric item with its web having a woven structure, the flange having a braided structure, and the web-flange being interconnected to each other by their respective constituent yarns which mutually pass through the thickness directions of each other.

To be able to produce a delamination resistant composite material with relatively higher mechanical performance and improved functionality, and importantly a practically useable material in a cost effective manner, than is possible presently, it is imperative to combine different fabric architectural constructions, i.e. the characteristic arrangement of fibres/yarns created by individual fabric-forming processes, such as interlacing (i.e. woven by weaving) and intertwining (i.e. braided by braiding) because these fabrics have structurally integrated constructions and their use as webs/s and flange/s renders them stable and firm, and thereby the 3D fabric item self-supporting for enabling further processing satisfactorily and obtaining a superior composite material component. A textile preform with no/poor structural integrity collapses easily making its handling and impregnation with matrix difficult, besides causing fiber misalignments, improper fiber distributions, fiber breakages etc., which contribute to impair performance.

Still more importantly, it is imperative that the intersecting junction/s of the web/s and flange/s are well integrated by way of mutual through-thickness connection of the web/s and flange's through their respective yarns. Such a mutual through-thickness integrated junction of a 3D fabric item would be naturally unified and resistant to delamination/separation, and thereby improve the mechanical performance and reliability of the final composite material.

There does not appear to be any method available presently for practically, effectively and economically producing a 3D fabric item with the aforementioned characteristic fabric architectural or structural constructions. The prior arts cited above have been devised primarily to produce an elongate structure with more or less regular/uniform/homogenous architecture and form. These existing methods do not provide possibilities to produce 3D fabric items that have completely different structural architectures of the web/s and flange/s. Further, these methods do not provide either a web or a flange or both web and flange comprising a combination of different fabric architectures. Also, they are limited in terms of their ability to produce only either a specific or few varieties of forms/shapes and dimensions. As a consequence, these existing methods do not provide much scope in engineering complex 3D fabric items which require broad and deep performance and functional features. That these methods are ineffective is evidenced by the fact that they continue to remain industrially unsatisfactory and unattractive.

The indirect or stitching methods allow plying and stitching different 2D sheet-fabrics, and thereby enable combining different structurally integrated fabric architectures in the production of profiled beam-like products. However, there is no mutual through-thickness connection of the web and flange. The direct or special 3D fabric-forming processes provide through-thickness connection of web and flange, but do not produce a structurally integrated web (or flange), and both the web and the flange with relatively different fabric architectures. These two approaches are discussed below as neither of them is able to engineer the required performance and functional features in 3D fabric items. Also, as will be noticed they are practically complicated and inefficient. A suitable new solution is therefore required now to solve the problem at hand and it is made available through the inventions disclosed herein.

The methods of stitching/joining/stapling of different planar fabric sheets (which have been manufactured previously, or pre-produced, by employing suitable processes) to produce profiled beam-like 3D fabric items are indirect and exemplified by U.S. Pat. No. 5,429,853, U.S. Pat. No. 4,331,495, U.S. Pat. No. 6,103,337 and U.S. Pat. No. 4,786,541. By this 'stitching' approach the constituent yarns of the web/s and flange's of the resulting profiled beam do not intersect and pass in their respective mutual thickness directions at the web-flange junction. There is no intersection of the web/s and flange/s because different fabric sheets are curved/bent/folded/angled to enable assembling and stitching for shape formation of the cross-section. The absence of mutual through-thickness intersection of yarns at the web-flange junction, due to use of folded/curved fabric sheets, creates a void/empty 'triangular' space at the junction when other fabric strip/s are applied to bridge the disjointed section/s of the web/s-flange/s. Due to discontinuity of yarns between the mutual thickness-directions of the web/s and flange/s, the junction's are rendered weak. Composite materials comprising such 3D fabric items delaminate, i.e. fail by cracking and splitting. As a consequence, the stitched/joined materials tend to be unreliable and hence are unusable in high-performance applications.

An improvement over the stitching approach is reflected in U.S. Pat. No. 4,379,798 wherein a 3D fabric is produced with selectively built-in connected and disconnected section's or portion's. The disconnected section/s can be subsequently bent/folded in required directions for creating and obtaining the final shape. However, as with the stitched/joined materials, this material also does not create the web and flange which intersect in mutual through-thickness manner. As a consequence, the bent/folded section/s require additional connection and bridging through use of other textile materials to resist structural failure under forces/loads. However, such connecting and bridging of oppositely folded sections fail because of the void/empty 'triangular' space that is created at the web-flange junction, whereby the structure is rendered weak, prone to delamination, and hence unreliable.

Some other disadvantages associated with the stitching method include: (a) mismatch of fibre properties between those used for stitching and that constituting the fabric/s, (b) fibre material used for stitching being incompatible with the matrix used for making composite material, (c) relatively loose, shaky and weak junctions make the structure unreliable and difficult to handle and predict performance behavior, (d) lower reliability due to fibre breakages arising from handling and stitching action, (e) fibre displacements and direction misalignments arising from handling and stitching action, (f) being labour intensive and time consuming, (g) causing fibre waste generation, which adversely impacts the environment, (h) being expensive without providing real advantages, and (i) unsuitable for creating 3D fabric items with complex shapes.

Furthermore, to enable stitching, the thickness of the web/s and flange/s has to be kept relatively low, which in turn directly renders the obtained profiled material relatively lower in mechanical performance (due to relatively low amount of fibers) and hence unsuitable for heavy-duty applications. In any case, stitching/joining two fabrics does not overcome the fundamental problem of delamination arising from absence of a mutual through-thickness connection between web/s and flange/s at their junction/s.

The direct production methods, exemplified by U.S. Pat. No. 5,021,281, U.S. Pat. No. 5,783,279, U.S. Pat. No. 5,121,530, U.S. Pat. No. 4,779,429, U.S. Pat. No. 4,686,134, U.S. Pat. No. 6,019,138 and WO91/06421 also do not provide satisfactory and reliable 3D fabric reinforcements. This is because these processes have one or more of the following important shortcomings:

The web does not comprise one or more walls/layers of structurally integrated yarns in $+/-\theta°$ orientations.
The flange does not comprise one or more walls/layers of structurally integrated yarns in $0°/90°$ orientations.
The yarns of structurally integrated flange/s and structurally integrated web/s do not pass through thickness directions of each other.
The flange walls/layers are more than one layer thick.
The flanges are not composed of multiple individual/separate walls/layers.
The flanges are not made with yarns in $+/-\theta°$ orientations.
The web/s is not made with yarns in $0°/90°$ orientation.
The web/s and/or flange/s are not tapered along the exterior longitudinal edge sides.
The longitudinal inner corners of web-flange junction are not filleted/rounded.
The web/s is not composed of a combination of different architectures or orientation of yarns.
The flange/s is not composed of a combination of different architectures or orientation of yarns.
The web/s and/or flange/s do not have varying heights and widths, and non-planar and non-symmetric constructions.
3D Fabric items without web and flange are not producible.
3D Fabric items having curved form are not producible.
They cannot process a ready or pre-produced fabric together with yarns that are made into a suitable fabric and combine the pre-produced and just-produced fabrics to create a 3D fabric item.

As can be noticed, these direct processes are unlike the indirect or stitching processes described earlier in that they do not use any ready or pre-produced suitable fabric/s that are structurally integrated to produce the required 3D fabric items. These processes cannot create a mutually intersecting junction of structurally integrated web/s and flange/s by using suitable pre-produced fabric/s of given architecture/s and a relatively different fabric architecture that is produced by integrating the yarns used in the process. These aspects will become clearer in the presentation below of the said prior arts.

Document U.S. Pat. No. 5,021,281 discloses profiled beam-like 3D fabric items wherein warp binding yarns (C) are incorporated in two bias angle (i.e. $+/-\theta°$ bias angle) orientations relative to the longitudinal direction of the web section of the indicated I-beam profile. However, these yarns (C) are not linked in any way to each other structurally, for example, intertwined, as happens in a braided fabric, but drawn linearly from a creel and trapped in a desired inclination in a plane (column 4, line 27-28) between the upper and lower flanges (A and B) (column 3, line 15-17) using healds (column 5, lines 40-44 and FIG. 9). Further, the yarns in the flange sections, which are oriented in $0°$ and $90°$ relative to the profiled material's longitudinal direction, are not interlaced in any way (column 5, line 18), as happens in weaving, but stacked and bound in respective flanges' thickness direction using other binding yarns (C1 and C2) as described therein (column 5, lines 20-22).

The +/−θ° bias yarns (C) in the web section occur without being mutually structurally linked in any way, i.e. the yarns (C) neither interlace (i.e. do not weave) nor intertwine (i.e. do not braid) nor interloop (i.e. do not knit), because there is no arrangement in the devised method for mutually integrating these yarns (C). Because of lack of any mutual structural connectivity/integrity between these (C) yarns, the web section remains as two separate sheets and hence unstable and prone to get easily disturbed and damaged. Further, the produced web section is an open structure like a trellis. It is not sufficiently filled with yarns to create a solid/undivided fabric plane. The deficiency of yarns makes the web resemble a truss structure, as can be noticed in FIGS. 8 and 9 therein. As a consequence, a web having a relatively low amount of yarns and without any structural integrity can neither accord performance nor be resistant to distortion during handling/further processing, such as matrix impregnation, and associated consequent damages. In fact such a limp web will tend to collapse under its own weight, as well as that of the upper flange's weight. Accordingly, realizing that such a textile structure is unsatisfactory in terms of dimensional stability and strength/rigidity, inclusion of hot-melting (i.e. thermoplastic) fibers has been suggested (column 4, lines 4-12) to join/bind the fibers for stabilization.

These shortcomings of the described process and material become abundantly self-clear when the profiled material's cross-section is considered to be T, instead of the illustrated I. The upper bends in the +/−θ° bias angle direction yarns (C) of the web (according to FIGS. 8 and 9) cannot be realized and supported in any way because there will be no flange, and hence no support to hold the +/−θ° bias yarns whereby the yarns of web will immediately collapse. Clearly, this method has extremely limited scope of applicability and usefulness.

As mentioned in document U.S. Pat. No. 5,021,281, the flanges of the I-beam profile are not interlaced (column 5, line 18). As a consequence and is represented in relevant Figures therein, each of the flanges is composed of three sets of yarns (11a-14a, 15a-18a, C1 and 11b-14b, 15b-18b, C2) each of which is running linearly in their respective directions (length, width and thickness). Such a non-interlaced architecture is technically unlike that of a conventional woven material which is composed of two sets of interlacing yarns (the warps and the wefts). With the yarns (11a-14a and 15a-18a), as also (11b-14b and 15b-18b), not being locked in positions by virtue of interlacing, the structure of the flanges tends to be unstable/non-rigid because its constituent yarns are displaceable easily. Such a structure thus does not provide the necessary structural stability/rigidity to the flanges.

Apart from the above limitations of the method according to U.S. Pat. No. 5,021,281, another important drawback of it is that it does not produce a profiled beam-like 3D fabric item with its surfaces at the longitudinal edges of either web/s or flange/s or both of these (depending on the profile's cross-section) with a taper to prevent concentration of stresses at the edges. Similarly, it does not produce a profiled beam-like 3D fabric item with filleted or rounded corners, where the surfaces of the web/s and flange/s meet, to prevent concentration of stresses at the corners.

Also, the foregoing method does not produce a profiled beam-like 3D fabric item wherein the web section has its constituent yarns in 0°/90° orientations and the flange section has its constituent yarns in +/−θ° bias orientations. Also, it neither produces a web with a combination of 0°/90° and +/−θ° orientated yarns, nor a flange with a combination of 0°/90° and +/−θ° orientated yarns. Further, this method does not produce the web/s and/or flange/s of multiple individual/separate but integrated layers. Also, this method cannot process any ready or pre-produced fabric in either its web/s or flange/s.

Document WO91/06421 proposes a profiled beam-like pre-form having a web portion and a flange portion. Referring to FIG. 1 therein, in the flange portion (1) at least two overlapping layers comprising parallel continuous fibers, or filaments, (4A/4B and 10) lie relatively in mutually right angle orientation, with the fibers (4A) of exterior layer oriented 90° to the longitudinal axis (3) of the pre-form. In the web portion (2) at least two layers of parallel continuous fibers, or filaments, (5A and 5B) lie relatively in mutually oppositely inclined angles orientation ('diagonally'), between 30° and 80°, with respect to the longitudinal axis of the pre-form. These inclined yarns are not intertwined and integrated in any way whereby the two layers of web remain separated. The inclined or angle-oriented fibers (5A and 5B) constituting the web (2) bend/'loop' only around the 90° oriented fibers (4A) of the exterior layer of the flange portion (1).

Clearly, none of the layers (4A/4B and 10) of the fibers constituting the flange (1) are individually integrated in any manner. Similarly, none of the layers (5A and 5B) constituting the web (2) are individually integrated in any way. The only structural connection between the flange (1) and the web (2) is that of the fibers (5A and 5B) bending or 'looping' around the exterior fibers (4A). Accordingly, in the proposed pre-form all the constituent fibers in an individual layer run linearly in their respective direction of orientation. There is no structural integrity within any constituent layer by either interlacing or interlooping or intertwining the involved fibers. In fact the corresponding associated processes, namely knitting, weaving and braiding are stated therein to degrade the axial strength and stiffness of fibers and thereby unsuitable. Yet, interestingly, the produced pre-form is called a 'woven' pre-form (page 7)! As the pre-form itself has no structural integrity, the constituent fibers are prone to delamination, disorientation, and loosing fiber distribution and linearity. Such a pre-form would naturally easily disintegrate and collapse, for example during pultrusion process, even before being made into a composite material.

As can be understood now, the pre-form according to WO91/06421 also has the shortcomings discussed in respect of 3D fabric item of U.S. Pat. No. 5,021,281. In any case, this method also cannot process any pre-produced fabric in either its web/s or flange/s.

Document U.S. Pat. No. 5,783,279 also specifies a profiled beam-like 3D fabric material which is produced by interlocking the yarns (202 and 203) constituting the web (200) with those of the upper and lower flanges (101 and 102) as shown in FIGS. 4 and 5 therein (column 6, lines 50-53). The production of this 3D fabric item involves engaging the web yarns (202 and 203) between upper and lower flanges, by (a) either pulling out the web yarns (202 and 203) by force through use of a wedge-like former (30), which expands or separates the two flanges apart to the required distance, as shown in FIG. 16a (column 9, lines 11-25), or (b) by drawing out a specified length of the web yarns (202 and 203) and hooking them in a series of loops raised above the skin of the upper flange at longitudinally spaced intervals and hold them at required height (FIG. 16b), which will eventually help to produce the required height of the web. Subsequently, as the fabric production proceeds, the two flanges (101 and 102) are slid apart over the hooked web yarns (202 and 203) (column 9, lines 35-59). An alternative way to produce the same directly (i.e. without having to separate the flanges) is also indicated (column 9, line 63 to column 10, line 3) wherein rearrangement of some components is proposed.

In any case, the 3D fabric item produced according to the above method has the yarns (202 and 203) constituting the web (200) meander between the upper and lower flanges. They are interlocked with the yarns of the flange/s. These yarns constituting the web are themselves not mutually integrated into an intertwined structure, like that of a braid, and therefore this 3D fabric item is also unstable and cannot support itself. It will tend to collapse and hence get distorted and damaged easily. The flanges of this 3D fabric item are technically not interlaced/woven because, as can be noticed in FIGS. 4 to 8 therein, the longitudinal yarns (103 and 104) and transversal yarns (105 and 106) run linearly in their respective directions without the characteristic interlacing of yarns associated with the definition of weaving. (This structure is identical with that of U.S. Pat. No. 5,021,281.) If the flange is really woven in this case, then technically its weave pattern is unlike that of plain or any other weave. The web producible by this method is again a relatively trellis-like open construction resembling a truss structure whereby lack of sufficient yarns renders it directly lower in performance. Also, sliding the flanges (101 and 102) over the web yarns (202 and 203) to separate them apart to required distance will naturally cause mutual abrasion of the involved yarns which in turn will cause damage to the involved yarns and hence result again in lower performance. Such an action will also cause distortion of the structure and thereby cause corresponding reduction in performance and reliability.

Further, the other shortcomings discussed in connection with the 3D fabric item of U.S. Pat. No. 5,021,281 apply equally well to the 3D fabric item according to U.S. Pat. No. 5,783,279. Once again, this method also cannot process any pre-produced or ready fabric in either its web/s or flange/s.

Document U.S. Pat. No. 5,121,530 also specifies a method for producing profiled beam-like 3D fabric item (3). This method is also technically not weaving because the foremost operation of weaving process, namely shedding, simply does not exist. In this method the involved yarns (Y) are continuously and linearly laid repeatedly in desired different orientations, in a laminated or plied/stacked manner (i.e. layer by layer) without being interlaced/woven, in any technically established weave pattern, to achieve desired thickness of wall. The yarns concerned are laid between pre-arranged tubular guide pins (G) which are finally removed and in its place select yarns (Y), in a loop form, are incorporated to achieve binding of the laid linear yarns to obtain the final required product. (These production steps do not technically comply with the principle of weaving.) Although the produced structure is an improvement over the earlier attempts, it still suffers from being a homogeneous structure in both the web/s and flange/s besides having other shortcomings presented earlier. In any case, the web does not comprise +/−0° oriented yarns. Yet again, this method also cannot process any ready or pre-produced fabric in either its web/s or flange/s.

Document U.S. Pat. No. 4,779,429 also provides a method of producing profiled beam-like 3D fabric items, the structure of which is more or less similar to that shown in U.S. Pat. No. 5,121,530 above but considered knitted simply because knitting needles are used in production. Two mutually perpendicular sets of knitting needles, arranged parallel to each other in their respective sets alternately draw and lay yarns in their respective directions through a predisposed set of yarns (14) in required sections to create the cross-sectional shape of the profiled beam-like 3D fabric items. The created structure still suffers from being homogeneous in both the web/s and flange/s besides having other shortcomings presented earlier. In any case, the web does not comprise +/−θ° oriented yarns. Yet again, this method also cannot process any ready or pre-produced fabric in either its web/s or flange/s.

Document U.S. Pat. No. 4,686,134 also provides a profiled beam-like material (1) produced by impregnating or covering a core fabric (2) with a suitable agent such as resin or the like (3), and solidifying it, which aids the retention of the given shape. The web and flange of the core fabric (2) are integrated and formed by braiding a plurality of groups of yarns (4-6) as indicated (column 5, lines 15-21). Whereas yarns (6) extend longitudinally, the yarns (4 and 5) extend obliquely to cross each other at 60° (column 5, lines 22-30; FIG. 2). This arrangement of yarns (4-6) is achieved by using a "torchon" lace knitting machine having two tracks for moving bobbins of braid yarns (column 6, lines 45-51; FIGS. 7 and 8). As the braiding yarns (4 and 5) curve or bend at the edges of the profiled beam being produced, there is no possibility of it fraying before impregnation. The produced web and flange have the same homogeneous architecture besides lacking in many of the other requirements stated earlier. This method also cannot process any ready or pre-produced fabric in either its web/s or flange/s and connect them in their mutual thickness directions.

The method according to document U.S. Pat. No. 6,019,138 is devised to produce wall/s that extend outwardly from a base portion to create a stiffened panel. This method also does not technically comply with the principle of weaving because its working necessitates use of three mutually perpendicular sets of yarns (10, 12 and 14) as indicated (column 1, line 60 to column 2, line 2 and column 2, line 62 to column 3, line 4). Further, for this process to work, it is indispensable to use at least two layers of yarns (10) as pointed out therein (column 3. lines 15-17). Technically this process functions unlike the weaving process where only two sets of yarns (the warps and wefts) are needed and the warp yarns can be of either single or multiple layer types. Further, because this process is technically not weaving, the produced fabric's architecture does not correspond to any known weave pattern (plain, twill etc.). As can be noticed in FIGS. 3-5, the indicated yarns (12) are incorporated linearly, i.e. without any interlacing (same as indicated in U.S. Pat. No. 5,021,281). In any case, the web is not composed of +/−θ° bias angle yarns and the respective structures of the web and flange remain structurally homogeneous and identical. This method also lacks in creating the other performance requirements stated earlier. As with various methods discussed above, this method also cannot process any ready or pre-produced fabric in either its web/s or flange/s to produce the stiffened panels.

As can be observed now, another important practical limitation of these known methods is that they cannot produce 3D fabric beams such as profiled beams with relatively large cross-section areas and the fibre content that are typically needed for most applications. Further, these discussed methods cannot incorporate yarns/tows in a combination of different orientations in flange/s and web/s of a 3D fabric item. Further, these methods cannot produce a 3D fabric item, such as an I cross-section beam, wherein the two flanges have +/−θ° bias angular orientation of yarns and the web has its yarns oriented in longitudinal (90°) and lateral (0°) directions. Also, they cannot produce a 3D fabric item, such as an I-beam, wherein both the flange/s and the web/s comprise yarns in +/−θ° bias as well as longitudinal (90°) and lateral (0°) directions in required different sequential lay-up arrangements. Also, they cannot produce a 3D fabric item, such as an I-beam, wherein the yarns in one flange are arranged relatively differently in architecture compared with the arrangement of yarns in the other flange.

Further, none of these known methods, or their combinations, can produce complex 3D fabric items comprising web/s and flange/s such as those having combined curved-straight sections, bends, converging/diverging shapes, circular objects, varying dimensions in one or more directions, relatively inverted cross-sections, sine curved shapes etc. Clearly, 3D fabric items which are unlike profiled beams, and therefore do not necessarily comprise planar/linear webs and flanges, cannot be produced by these existing processes.

Further, all these known methods are not capable of handling and integrating a ready or previously produced fabric with the yarns used for producing a fabric in the process. In other words, they cannot produce a 3D fabric item by using a suitable pre-produced fabric of a given architecture and add it on, or combine it, in an integrated manner with the fabric being produced using yarns. By these known processes it is not possible to obtain integration of a pre-produced add-on fabric with a just-produced interacting woven fabric in their mutual through-thickness directions to create web/s and flange/s which mutually intersect at their junction's and directly result in a wholly integrated profiled beam-like 3D fabric item.

A person skilled in the art can infer now from the foregoing presentation that the presently available methods are insufficient, inefficient and incapable of producing truly advanced and complex 3D fabric items, for meeting the increasing mechanical performance and reliability demands of emerging high-performance composite materials, practically and in a cost effective manner.

Accordingly, there is still a need for improvements in respect of methods and apparatuses for producing 3D fabric items, and in respect of such produced 3D fabric items.

SUMMARY OF INVENTIONS

It is therefore an object of the present invention to provide a three-dimensional fabric item, and a method and apparatus for producing such items, which at least alleviate the above-discussed problems encountered in the prior art.

This object is obtained by means of the three-dimensional fabric item, the production method and the production apparatus as defined in the appended claims.

According to a first aspect of the present invention there is provided a three-dimensional fabric item comprising at least one complementary fabric and at least one interacting woven fabric, wherein the complementary fabric is a pre-produced, in itself structurally stable, fabric, and wherein the interacting woven fabric comprises interlaced warps and wefts, wherein at least some of the warps and/or wefts of the interacting woven fabric penetrate through the complementary fabric in the thickness direction, whereby the complementary fabric and interacting woven fabric are connected to each other at their intersecting junction forming a three-dimensional fabric item.

The item is preferably in the form of a profiled cross-section beam wherein its constituent complementary fabric is either its web or flange and its constituent interacting woven fabric is correspondingly either its flange or web. However, the item may also be in a form other than that of a profiled cross-section beam, wherein its constituent complementary fabric is one of the members or sections or components or parts, and its constituent woven fabric is the other member or section or component or part of the three-dimensional fabric object.

The three-dimensional fabric item preferably comprises at least one complementary fabric and at least one interacting woven fabric having relatively different structural architectures.

The item may further comprise at least a combination of two complementary fabrics. These two or more complementary fabrics may have similar or dissimilar architectures. Further, these two or more complementary fabrics may be incorporated together or separated in said three-dimensional fabric item. In case they are incorporated together, they are preferably arranged in direct contact with each other. In case they are incorporated separated, the space forming the separation distance may be connected at required places. The at least two complementary fabrics may further be incorporated in a parallel or non-parallel arrangement to each other in said fabric item. In a preferred embodiment, the at least two complementary fabrics both are penetrated by warps and/or wefts of a common interacting woven fabric.

The item may further comprise a combination of at least two interacting woven fabrics. These fabrics may be of similar or dissimilar architectures. Further, these fabrics may be used and incorporated together or separated. In case they are incorporated together, they are preferably arranged in direct contact with each other. In case they are incorporated separated, the space forming the separation distance may be connected at required places. Further, the at least two interacting woven fabrics may be incorporated in parallel or non-parallel arrangement to each other.

The at least one interacting woven fabric may extend from both face sides of a complementary fabric. Additionally or alternatively, the at least one interacting woven fabric may either extend between two walls of individual separated complementary fabrics or two walls of a single curving complementary fabric.

The structural architecture of the complementary fabric is preferably at least one of: woven, knitted, braided, any type of non-woven, laced, embroidered, non-crimped fabric (NCF), unidirectional, net and pile type.

The complementary fabric is preferably at least one of 2D, 2.5D and 3D fabric.

At least one of the complementary fabric(s) is preferably at least one of uniaxial, biaxial, triaxial, quadaxial, multi-axial type.

At least one of the complementary fabric(s) is preferably in at least one of flat or planar shaped or non-planar shaped configuration, or in a combination of these configurations.

At least one of the complementary fabric(s) may form at least one of a solid, a shell, a hollow, and a solid with openings, or a combination of these types.

Further, two or more adjacently occurring complementary fabrics and/or woven fabrics may be connected to each other by additional fastening, said additional fastening preferably being at least one of sewing, stitching, stapling, bonding, fusing and pinning.

According to another aspect of the present invention there is provided a method for producing a three-dimensional fabric item comprising at least one complementary fabric and one interacting woven fabric interacting in a mutual through thickness manner, said method comprising the steps:

providing at least one pre-produced, in itself structurally stable, complementary fabric; and weaving at least one interacting woven fabric by interlacing warps and wefts, wherein at least some of the warps and/or wefts penetrate through the complementary fabric, whereby the interacting woven fabric and complementary fabric are connected to each other at their intersecting junction forming a three-dimensional fabric item.

Preferably, a set of two or more architecturally similar or different individual complementary fabrics are provided.

At least one provided complementary fabric is preferably held with at least one of its face sides facing in the direction of the warp yarns of said interacting woven fabric.

The provided complementary fabric is preferably held with its face sides perpendicular to or at an angle to the weft insertion directions of said interacting woven fabric(s).

The provided complementary fabric may be held stationary about an axis or held intermittently stationary and intermittently turned about an axis during weaving.

The weaving step preferably comprises the steps of:

forming sheds by displacing the warp yarns in a direction other than the thickness direction of the interacting woven fabric being produced;

inserting wefts into said sheds and penetrating through said complementary fabric; and packing the inserted wefts at fabric fell position, preferably using at least some of the warp yarns displaced for shedding.

The weaving of the interacting woven fabric preferably comprises forming the shed facing in the direction of the complementary fabric to direct the insertion of weft for penetrating through the complementary fabric perpendicularly or at an angle relative to the surface of the complementary fabric.

The steps of shedding and weft inserting may preferably be performed at a mutually constant positional relationship.

The weaving of interacting woven fabric preferably comprises forming sheds simultaneously at two face sides of the complementary fabric to form interacting woven fabric that extends on both said face sides of said complementary fabric.

The weaving step further preferably comprises the step of maintaining a constant width of the produced interacting woven fabric.

The weaving step may further comprise the step of supplying the warp yarns and the weft yarns.

According to still another aspect of the present invention there is provided an apparatus for producing a three-dimensional fabric item comprising at least one complementary fabric and at least one interacting woven fabric, said apparatus comprising:

a holder or clamping arrangement for holding a pre-produced, in itself structurally stable, complementary fabric;

a weaving system for weaving an interacting woven fabric by interlacing warps and wefts, wherein at least some of the warps and/or wefts penetrate through the held complementary fabric in the thickness direction, whereby the complementary fabric and interacting woven fabric are connected to each other at their intersecting junction forming a three-dimensional fabric item.

The a holder or clamping arrangement preferably comprises clamps for holding the complementary fabric during weaving. The holder or clamping arrangement may further be arranged to hold the complementary fabric stationary about an axis or to hold the complementary fabric intermittently stationary and intermittently turned about an axis during weaving.

The weaving system may comprise:

a shedding arrangement for forming sheds by displacing the supplied warp yarns in a direction other than in the thickness direction of the interacting woven fabric being produced;

a weft inserting arrangement for inserting weft yarns into said sheds and penetrating through the complementary fabric;

an advancing arrangement for enabling formation of successive shed and insertion of successive weft.

The shedding arrangement preferably comprises a plurality of shedding units, each shedding unit being able to produce an individual interacting woven fabric layer to integrate with the complementary fabric.

At least one shedding unit in the shedding arrangement may be movable in one or more planes to enable production of a corresponding number of individual interacting woven fabrics that are relatively parallel or non-parallel to each other and relatively parallel or non-parallel to an edge of the complementary fabric.

Two or more shedding units in the shedding arrangement may face in same direction or at an angle to each other or oppositely.

The orientation of the shed formed by the shedding arrangement is perpendicular or at an angle relative to the face of the complementary fabric to correspondingly direct the insertion of weft through complementary fabric.

A shedding unit may comprise at least one heald for displacing an individual warp for enabling weaving between said warp yarn and the complementary fabric.

The shedding arrangement preferably allows the complementary fabric to pass between its healds.

The weft inserting arrangement preferably inserts the wefts as singles or doubled/folded through the shed and penetrates through the complementary fabric perpendicularly or at an angle relative to the surface of the complementary fabric.

The shedding arrangement and the weft inserting arrangement may be moveable with a constant positional relationship.

The advancing arrangement preferably supports the shedding and weft inserting units to traverse and guide them in linear or angular or curving or circular or suitable combination of these paths to facilitate formation of successive sheds and insertion of successive wefts for enabling uniform/consistent production of the required 3D fabric item.

A clamping arrangement may further be included in the weaving system for maintaining a constant width of the produced interacting woven fabric.

Further, arrangements for warp supply and weft supply may be included in the weaving system.

According to still another aspect of the present invention, there is provided a composite material reinforced with a three-dimensional fabric item of the type discussed above.

As is well known and an established practice, weaving is performed using warps and wefts in the forms of yarns, filaments, tows, rovings, fibers, tapes etc. Again, these different assemblies of filaments/fibers are henceforth referred to as only yarns. The warp yarns and weft yarns are mutually interlaced (in a certain weave pattern, such as pain, twill etc.) resulting in a woven fabric.

The present weaving invention differs characteristically from existing weaving methods in that at least one suitable ready or pre-produced fabric, henceforth referred to as Complementary Fabric, or in its abbreviated form as CF, is added-on in the weaving process, in addition to the warp yarns and weft yarns that interlace with each other, and the warp and/or weft yarns penetrate through the thickness direction of CF, producing an interacting woven fabric which simultaneously integrates with the CF used, and thereby lead to creation of novel 3D fabric items.

The "interacting woven fabric" will in the following often simply be referred to as the "woven fabric".

As can be understood now, by this novel add-on weaving method the employed CF and the material being woven using warp and weft yarns are integrated with each other in a mutual through-thickness connection whereby innovative profiled beam-like 3D fabric items and other types of 3D fabric items are directly obtained. The 3D fabric items producible by this novel add-on weaving method do not appear to be producible by any known method.

The complementary fabric (CF) is a pre-produced, in itself structurally stable, fabric. In the context of the present application, this means that the CF in itself has such a structural integrity that it will be a structurally stable fabric prior to weaving of the interacting woven fabric. It also means that the CF will remain a structurally stable fabric even if the interacting woven fabric would be subsequently removed. Such a structurally integrated CF can thus be extracted or released from the produced 3D fabric item, for example by cutting off and removing the relevant yarns of the interacting woven fabric that penetrate through or connect with the CF.

By "thickness direction" and "penetration through the thickness direction" is in the context of the present application to be understood a direction which may be entirely in the thickness direction, i.e. entirely perpendicular to a surface of the complementary fabric (CF), or partly in the thickness direction and partly in another direction, i.e. in an angular-non-perpendicular and non-parallel-direction with respect to a surface of the complementary fabric (CF).

The add-on weaving method according to the present invention is capable of handling all different kinds or types of CFs. For example, the CF used can be either woven or knitted or braided or any type of non-woven or lace or NCF (non-crimp fabric) or embroidered or unidirectional or net or pile etc. The CF can be either an individual fabric or a combination of any two or more of these fabric types and of equal or relatively different dimensions. Further, the CF used can be planar/sheet-like of either uniaxial (i.e. having most yarns oriented in one direction) or biaxial (i.e. having yarns oriented in two directions) or triaxial (i.e. having yarns oriented in three directions) or quad-axial (i.e. having yarns oriented in four directions) or multiaxial (i.e. having yarns oriented in four or more directions) types or a suitable combination of at least any two of these types. The CF can also be either one of or any combination of 2D (i.e. integrated single layer planar sheet-like or shaped/non-planar sheet-like structure; wherein constituent yarns are supposed to be disposed in one plane), 2.5D (i.e. structure like integrated projecting loops of yarns from a base fabric; wherein constituent yarns are supposed to be disposed in two mutually perpendicular planes), and 3D fabric (i.e. integrated multiple layer sheet-like structure in planar or shaped configurations; wherein constituent yarns are supposed to be disposed in three mutually perpendicular planes) types as well. The CF can be also of sandwich, spacer etc. fabric types. Further, the CF can be of either dry or pre-preg or suitable combination of both these types. Further the CF can be of a single fabric type, or a set of combination of more than one of either similar or different individual fabric types. A set of CF could also be composed of similar or dissimilar fabrics of relatively different dimensions. Such fabrics of different dimensions constituting a set of CF could be arranged in any required manner. For example, some relatively smaller CFs could be arranged individually on a larger CF in any desired positions or some CFs of one dimension could be plied and arranged on another CF of another dimension. Also, in a set of combined CFs, the used fabrics can be organized together in any stacking sequence such as regular, irregular, random, mirrored about a plane, etc. or separated. When using two or more CFs, they can be had in either parallel or non-parallel arrangements. Also, when using two or more CFs, they can be had either adjacently together or separated from each other. The fabrics constituting CF can be either similar or dissimilar in terms of its constituent fibre material/s, constructional architecture/s, color/s, areal weight/s, thickness etc. Also, the fabrics used as CF can be those produced using short fibers, long fibers and continuous filament fibers or a combination of at least any two of them. Further, the fabrics used as CF can be those produced using yarns, tows, plied yarns, fancy yarns, threads, twines, cords, flat yarns, tapes, unidirectional fibrous materials etc. If required, metallic wires, thermoplastic wires, cables etc. can also be used. Further, the CF used can be either of the flat/planar sheet-like or circular/tubular or shaped types. The shaped type fabrics could be planar or three-dimensional such as those produced directly (e.g. a sock shape) or indirectly (e.g. umbrella or hat shapes by stitching). Even a 3D fabric item according to the present invention could be used as a CF in a second step to produce another 3D fabric item. The CF/s employed in this weaving method when producing profiled beams, constitute either its web/s or the flange/s. When producing more complex 3D fabric items, the employed CF can constitute a member/section/component/part etc. depending on the complexity of the produced object's shape or form. An individual CF can be either an uncut or cut or partly cut fabric piece. Again, depending on the performance and processing requirements of the 3D fabric item, suitable thermoplastic materials in sheet-like or other forms can be used either together with CF or independently, for functioning as, for example a meltable matrix to directly obtain a composite material.

Further, the CF used can be had in either linear or curving or both linear and curving forms, and not necessarily in a flat or plain form. Also, the shape of the CF need not necessarily be rectangle-like; the CF can be of any desired shape and dimensions to meet the objective. Further, the woven fabric being produced by interlacing warps and wefts can be connected to CF either perpendicularly to the employed CF's surface, or at any other required angle. Further, the types of CF used in creating a 3D fabric item can be either solid or with openings of desired shapes such as square, rectangle, triangle, polygonal, circular, oval, rhombus, trapezoidal, irregular etc. Thus, this weaving process uniquely enables using many different types of CFs, and in different orientations, along with warp and weft yarns for producing countless types of profiled beam-like and other complex 3D fabric pre-forms for functioning as customized reinforcements and enabling manufacture of delamination resistant and high-performance composite materials.

Further, the fibre material and type of warp, weft and CF comprising the 3D fabric item producible by this add-on weaving method can be like yarns, tows, filaments, rovings, tapes, spread fiber tapes, twines, strands, strings, cords, metallic wires, thermoplastic wires, cables etc. The fibrous materials can be of either similar or dissimilar types from a range of inorganic, synthesized and organic fibres such as carbon, ceramic, basalt, boron, metal, glass, thermoplastic, (polyester, polyamide, acrylic, aramid, PEEK etc.), cotton, jute, flax, silk, coconut, bast, wool, sea-weed based etc.

Further, co-mingled, blended, hybrid, chemical formulation bearing, coated, sheathed fibre bundles, conjugate, co-axial, nano etc. types of fibers could be also considered. When using a thermoplastic material in sheet-like or other shaped forms, it can be of any suitable type, such as solid, perforated, slitted, with holes etc., to serve the intended purpose.

The device for carrying out the novel add-on weaving process is also uniquely characterized in that it processes at least one suitable CF together with warp yarns and weft yarns, and integrates them in mutual thickness directions to produce directly a 3D fabric item. The novel add-on weaving device thus produces a profiled beam-like 3D fabric item, and other complex 3D fabric items, by integrating the employed CF with the fabric being woven using warp yarns and weft yarns in accordance with the performance and other requirements of the final shape or form and dimensions.

The novel add-on weaving device devised for producing innovative 3D fabric items is provided with a new shedding system, to perform the foremost weaving operation, through which the warp yarns can be controlled/displaced for creating the shed/s while allowing the CF to pass through. Depending on the cross-sectional profile or the shape of the 3D fabric item required to be produced, shedding is performed at at least one face side of the employed CF.

The shedding unit/system comprises special healds (to be described later), which are preferably unlike those used in existing shedding systems. A number of these healds are preferably arranged in a paired set in a unit. The least number of paired healds in a unit for weaving can be one (i.e. two healds). However, in certain situations just one heald is also employable because of the unique presence of CF in this add-on weaving process. Further, either one or more units of paired sets of healds can be used in a shedding system. When using more than one shedding unit, they are preferably arranged in series to create multiple sheds (depending on what is required to be produced). The multiple sheds are created either individually in certain pre-defined sequence or simultaneously. Each of the multiple sheds is created to produce individual fabric layers which are integrated with the employed CF. As indicated, this shedding system allows a single warp yarn to be manipulated and used for generating a required shape in conjunction with CF.

Further, the multiple sheds are produced at: (a) relatively different steps-like levels from each other, and (b) relatively mutually separated points in the weaving direction of the 3D fabric item. Thus, the number of warp layers and weft layers can be either one, or more than one to create corresponding number of woven layers in this novel add-on weaving method. Further, either all the supplied warp layers can be parallel to each other, or non-parallel to each other or some can be parallel to each other while others are relatively non-parallel whereby corresponding woven fabrics are created attached to the CF. Depending on the 3D fabric item to be produced, some warp yarns could be removed or extra ones added during weaving.

Also, to quicken the production of 3D fabric items having more than one parallel flanges, corresponding number of series of shedding units can be organized in parallel. Again, depending on the cross-sectional profile to be produced, a series of shedding units can be also organized in relatively angular orientation to another series of shedding units. In any case, each shedding unit is devised to produce one woven fabric layer. A series of shedding units will thus produce corresponding number of woven layers, preferably simultaneously to render the process efficient. To exemplify, multiple ribs can be produced simultaneously and integrated with CF for obtaining directly a delamination resistant stiffened sheet/plate.

Further, in this novel shedding system the warp yarns are preferably supplied at an angle, preferably about 90°, to the plane of the woven fabric being produced, and not parallel/in-line or straight with fabric plane as is conventionally done. Thus, during shedding operation the warp yarns are not displaced in the thickness direction of the fabric being produced, as happens with conventional shedding methods, but they are displaced in the length direction of the fabric being produced. By supplying warp yarns at an angle to the plane of the woven fabric being produced, their displacement in fabric's length direction during shed formation uniquely aids packing-in the laid weft/s towards fabric-fell position and thereby the operation of beating-up wefts using reed is advantageously rendered redundant in this novel add-on weaving method. The weaving process thus uniquely becomes relatively simpler, gentler, safer, quieter, faster and economical. Nonetheless, for producing some 3D fabric items, a shedding unit capable of displacing the warp yarns in fabric-thickness direction can be also used.

Further, all the required shedding units are incorporated in a sub-framework of the weaving device's main framework. This sub-framework is included in the main framework in a manner whereby its position can be altered relative to the main framework. Thus, the position of the shedding unit/s is not fixed relative to the main framework, but is movable and can be changed in desired X, Y and Z directions through suitable arrangements that can be controlled by suitable programs to enable direct production of profiled beam-like and complex 3D fabric items.

The innovative add-on weaving device also incorporates a novel weft inserting unit, to complete accomplishment of interlacing of weft yarns with warp yarns to technically realize the defining feature of the weaving process. In correspondence with the number of sheds (and hence woven fabrics) being created, i.e. either single or multiple, corresponding number of wefts are accordingly inserted by the weft transporting means of the inserting units. Thus, there can be more than one number of individual weft inserting units in the add-on weaving device. Whether a shed is created at either one or both face sides of CF, preferably a paired set of weft inserting/driving units for handling one means for transporting weft is used. Each unit of the pair is located at either face sides of CF. If multiple sheds are produced, then corresponding number of weft inserting paired units are accordingly used at correspondingly different levels of sheds, and they are positioned separated from each other to insert the wefts. In other words, as multiple sheds are mutually separated in the longitudinal direction of the warp yarns, the corresponding number of weft inserting paired units is correspondingly separately arranged at different levels. By this novel weft inserting system more than one weft are preferably laid simultaneously in corresponding mutually separated sheds, which are created at relatively different levels, to interlace with the warp yarns and connect with the CF used to directly produce 3D fabric items, including profiled cross-sectional beams and other relatively complex objects. In this add-on weaving method it is also possible to use a single weft inserting unit which is positioned at only one face side of CF when a doubled/folded/hair-pin like weft is to be incorporated in a shed, and hence in the woven fabric that is being produced and integrated with the employed CF to directly obtain a 3D fabric item.

Further, as with the shedding units, the weft inserting units are also incorporated in the same sub-framework of the weaving device's main framework. Accordingly, the positional relationship between each of the shedding and weft inserting units is constant or fixed. Thus, if the sub-framework is moved relative to the main framework, the shedding and weft inserting units will move jointly in desired X, Y and Z directions through suitable arrangements that can be controlled by suitable program to enable direct production of profiled beam-like and complex 3D fabric items.

For enabling satisfactory progression of weaving, the add-on weaving device also incorporates a suitable advancing unit so that successive weft insertions can be performed. This advancing unit is connected to the main framework and preferably bears the sub-framework which houses the shedding and weft inserting units.

The web/s and/or flange/s, or both these, of the novel 3D fabric items can be either single-walled type CF or multiple-walled type CF to achieve the desired performance and function requirements. Further, a 3D fabric item produced with multiple wall CFs to achieve certain required wall thickness can have these CFs in either separated/disjointed, or connected/jointed, or partly connected and partly disjointed arrangements. Further, the woven fabric constituting at least one of the CFs of either the flange or web can be either similar or dissimilar in architecture to the other CF/s constituting the same flange or other flange/s and web/s of the 3D fabric item. Preferably at least one of the CFs constituting either the web/s or flange/s are relatively architecturally different in construction to the other to achieve improved mechanical performance of the profiled material.

Further, when producing a profiled beam-like 3D fabric item, its web/s and flange/s can be either at 90° to each other, or at any other required/suitable angle to each other. Further, the profiled beam-like and other 3D fabric items can be either of linear type or curving type, or partly linear and partly curving, or combination of both linear and curving types such as an I-beam with linear flange/s and curving webs. Further, the profiled materials' curving or bending directions can be either latitudinal or longitudinal. Further, in such profiled beams either the web/s or flange/s are linear, or one of them is linear and other is curving, or both are curving. When producing complex 3D fabric items which are not beam-like, then again virtually limitless construction types can be created.

Further, the cross-section of the beam-like profiled and other 3D fabric items can be of either non-tubular or tubular types. Further, such 3D fabric items can be of either solid, or shell, or hollow or with openings or combination of at least any two of these types. The hollow type 3D fabric item could also be filled with e.g. suitable yarns/fibers, if required. Further, the 3D fabric item can have either symmetrical or asymmetrical shape/form about at least one of its three principal axes. Further, the cross-sectional dimensions along the length direction of the 3D fabric item can be either constant or varying. Further, the respective dimensions of either the web/s or flanges/s or both can be either constant or varying. Further, a 3D fabric item can have different dimensions of its web/s and flange/s, or differing cross-sectional shapes at its two ends. For example, a beam with relatively inverted "T" cross-sections at its end sides can be directly created in the same 3D fabric item. Further, when a 3D fabric item is produced using more than one CF and/or with more than one woven layer in a flange or web, such different layers of individual fabrics can be connected to each other in their respective thickness direction, at places where and if required, by any known technique such as sewing, stitching, stapling, bonding, fusing, pinning etc.

As can be understood now, this novel add-on weaving method is devised to create novel high performance 3D fabric items directly, quickly and cost-effectively by using and integrating a CF with the fabric that is being woven using the warp and weft yarns such that the CF and the produced interacting woven fabric/s are integrated in their mutual through-thickness directions at the junction/s where the web/s and flange/s intersect.

This innovative add-on weaving method technically fully complies with the principle of weaving as the warps and wefts can be interlaced in the required weave patterns such as plain, twill and others. The weaving is performed at either one or both the face sides, or surfaces, of the employed CF. The novel add-on weaving method is further uniquely capable of interlacing the wefts at either 90° to the warp yarns, or at any other desired angle relative to the warp yarns, while integrating with CF. Also, this method is equally capable of weaving single individual woven layer and multiple individual woven layers that are connected to the CF. The plane of the produced interacting woven part is preferably projecting at an angle from at least one of the surfaces of the employed CF, while being attached to the CF, resulting directly in a novel fully mutually through-thickness integrated 3D fabric item.

The innovative 3D fabric types producible by the novel add-on weaving method are generally directed for reinforcing composite materials, although they could find use in other technical textile areas as well such as medical, military, shelter, transportation, injury mitigation, protection etc. These new 3D fabric items, when impregnated with suitable matrix, enable realization of high-performing and reliable composite materials not encountered earlier for truly realizing composite materials' performance and functional potential relatively quickly and at lower costs. These and other features of the inventions will become apparent from the drawings and description of preferred embodiments that follow next.

BRIEF DESCRIPTION OF DRAWINGS

The present inventions relating to the add-on weaving method and device for producing 3D fabric items using CF, warps and wefts, and the 3D fabric items thereof, which are particularly useful for reinforcing and manufacturing composite materials, are illustrated in the following drawings by way of examples wherein:

FIGS. 3a-3b exemplify the main components of and their relative organization in the shedding unit/arrangement.

FIGS. 5a-5d exemplify a working cycle of the shedding arrangement.

FIG. 6 exemplifies the main components of and their relative organization in the weft inserting unit/arrangement.

FIGS. 8a-8d exemplify a production cycle of the add-on weaving process.

FIGS. 9a-9f exemplify different organizations of the shedding units/arrangements for producing correspondingly different 3D fabric items.

FIGS. 10a-10b exemplify relative organization of shedding units/arrangements in the add-on weaving process for producing bias structures.

DESCRIPTION OF PREFERRED EMBODIMENTS

The Add-on Weaving method according to the present invention produces 3D fabric items wherein Complementary Fabric/s (CF), warp yarns and weft yarns are involved. Depending on the construction and form desired, a 3D fabric item is produced by weaving the warp and weft yarns into an interacting woven fabric that simultaneously integrates with the CF in a mutual through-thickness connection. The novel weaving method involves the following three primary operations: Shedding; Weft-inserting, and Advancing.

Figure 1:
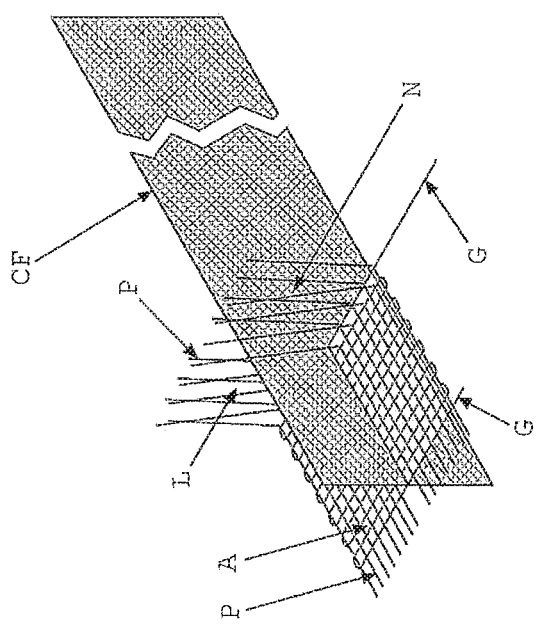
FIG. 1 exemplifies the add-on weaving method for manufacturing 3D fabric items.

For ease of explaining the spirit of the invention, the basic principle of producing a beam-like profiled 3D fabric item of "+" cross-section is considered as it represents a composition of one web and one flange intersecting in mutual thickness directions. The method is represented in FIG. 1. A Complementary Fabric (CF), of suitable material, architecture, shape and dimensions, which is required to be the web of the "+" profile, is suitably supported in required orientation and position, and preferably held stationary. Required number of warp yarns (P) of suitable material and tex count, for producing the woven flange (A) of required width and thickness, are supplied from suitable source/s and arranged at both face sides of CF. Warp yarns (P) are preferably supplied in a suitable angular orientation to the plane/surface of the fabric (A) being woven as shown in FIG. 1. These warp yarns (P) are subjected to shedding in a manner whereby warp yarns (P) are displaced in length direction of fabric (A) being woven and a shed is created in a paired manner at either face sides of CF.

A novel aspect of the created pair of sheds (L and N) is that they individually occur at either face sides of CF and receive the same weft. Another novel aspect of the paired sheds (L and N) is that they are unconventionally oriented at an angle relative to the plane of fabric (A) being woven at the face sides of CF. As a consequence, the warp yarns (P) get displaced in the length direction of the fabric (A) being produced, and not in the thickness direction of the fabric (A), as happens in conventional weaving processes. The sheds (L and N) are oriented angularly relative to the plane of the woven fabric (A). They are not in line with the plane of woven fabric (A). Such an angular orientation of the shed enables two important benefits. First, it directly enables packing of the weft (G) inserted in the shed using some warp yarns and without involving the use of a beating-up reed, as is associated with the conventional weaving. Second, as will become clear later, a parallel or non-parallel and simultaneous production of multiple woven fabric layers is enabled to realize desired different constructions and forms of 3D fabric items efficiently. These are some notable advantages of this novel shedding method. Accordingly, through use of this novel shedding arrangement the beating-up operation is rendered unnecessary and hence dispensed with making this innovative add-on weaving method efficient.

The warp yarns (P) are subjected to shedding operation, as indicated in FIG. 1, whereby paired sheds (L and N) are preferably simultaneously created at either face sides of the supported CF. Shedding is performed at a predetermined position in reference to the top (or bottom) edge of supported CF to integrate the interacting woven fabric (A) being just-produced with the CF for obtaining directly the required "+" cross-section profiled beam-like 3D fabric item.

Next, a weft (G) is inserted into the created pair of sheds (L and N) during the weft inserting operation. In the shown cycle of weaving in FIG. 1, weft (G) enters first in shed (L) towards CF, then penetrates/passes through CF and enters the adjoining shed (N) on the other side of CF, and finally it emerges from the shed (N).

The weft (G) which is inserted in the paired sheds (L and N) is entrapped between the warp yarns (P) when the following new shed is created after performing the advancing or taking-up operation, which is done by advancing the positions of the shedding and weft inserting units, preferably jointly, in relation to the supported stationary CF. As a result, the CF and the just interlaced or interacting woven material (A) are directly integrated in a mutual through-thickness manner and the production of "+" cross-section profiled beam-like 3D fabric item accomplished. To continue production of 3D fabric item further, the relative plane of subsequent shed is changed with respect to the just-laid weft by advancing shedding and weft inserting units preferably jointly relative to stationary CF.

The advancing or taking-up operation in this add-on weaving method is performed taking into account the complexity of shape of the 3D fabric item being produced. Accordingly, it can be either linear or angular/circular or combination of both these types. In the linear advancing system, either the means for performing shedding and weft-inserting operations are preferably jointly advanced away linearly from the last laid weft by a required take-up distance relative to the stationary CF, or alternatively the shedding and weft-inserting units are preferably jointly maintained stationary and the CF is advanced relatively by a required take-up distance. Further, the linear advancing system can be performed either in one plane or in, for example, two planes which are not parallel to each other. The former linear advancing system is suitable when producing generally linear beam-like profiled cross-sections 3D fabric items such as +, T, I, Pi, L etc. The latter system is suitable for producing 3D fabric items, which are for example step-like, sine curve-like and frame-like.

The advancing operation could be also of angular/circular type when using CF that is not extending linearly such as is required when producing beam-like 3D fabric items. The CF in this case has either a regular shape (like flat circular disc, tube-like etc.) or an irregular shape. Such a CF is preferably turned about a fixed axis by a required angle after each weft insertion to create space for the formation of subsequent shed and weft insertion. In this case the shedding and weft inserting units are preferably jointly maintained stationary in their positions relative to turning CF to keep the process relatively simple and to accord ease of operation. This type of angular/circular advancing system is suitable for producing 3D fabric items that are for example hat-like, curving beam-like profiled cross-sections, rimmed discs etc.

Alternatively, a linear-angular/circular combination type of advancing system could be also employed. In this case, a CF is rotated by a required angle intermittently about a fixed axis after each weft insertion and the shedding and weft inserting units are advanced linearly. Such advancing system is required for producing 3D fabric items such as a tubular shaft having radial helical rim attached to its surface. Alternatively, the CF is maintained stationary until a linear woven fabric of required length has been produced and then the CF is turned by a required angle. Such a system is required for producing 3D fabric items such as a tubular shaft having longitudinal linear fins attached to its surface.

Needless to state, a person skilled in the art will understand now that a variety of high-performance and functional 3D fabric items of dimensions ranging from relatively very small to very large, and of complex forms and shapes, can be manufactured directly and relatively easily, quickly and cost effectively by this novel add-on weaving method.

Figure 2:
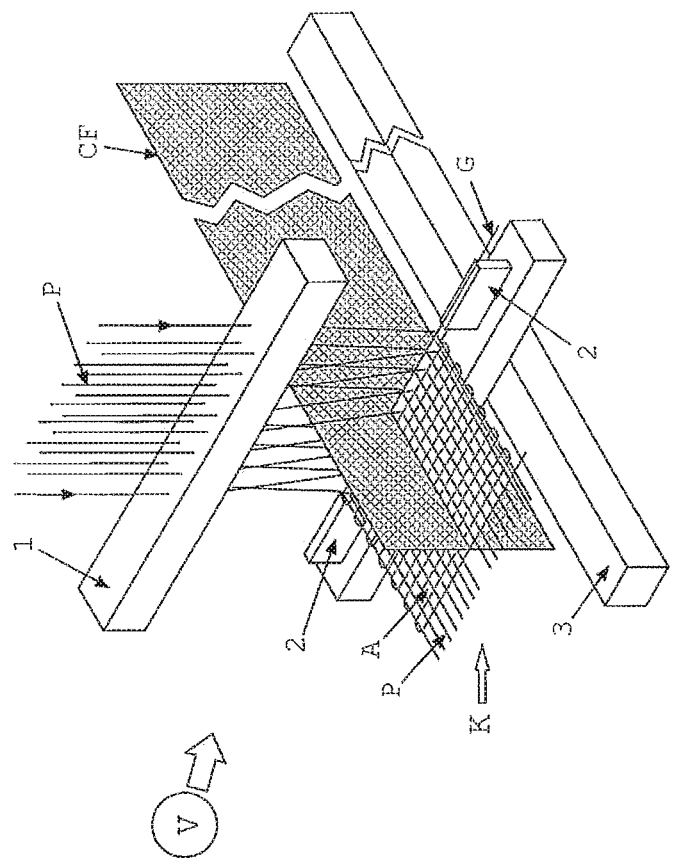
FIG. 2 exemplifies the three main units/arrangements required for practically performing add-on weaving and their relative disposition in the add-on weaving device for producing 3D fabric items.

The novel add-on weaving method is practically realized through an innovative add-on weaving device (V) shown in FIG. 2. The device comprises three primary units/systems/arrangements/means etc., indicated below, for performing the primary operations. Each of these units is uniquely devised and their working is described below: Shedding unit (1); Weft-inserting unit (2); and Advancing unit (3).

The preferred working and relative positions of the primary units, namely shedding (1), weft inserting (2) and advancing (3) units, which constitute the add-on weaving machine (V) shown in FIG. 2, are specifically devised and arranged to produce novel 3D fabric items (K). The main framework of machine (not shown) supports a movable sub-framework (not shown) on to which the required number of the warp beam/s and/or spool/s (not shown) to supply warp yarns (P), the shedding unit (1) and the preferable paired weft inserting unit (2) are mounted and supported. This movable sub-framework, which supports the units for shedding (1) and weft inserting (2), is supported and moved by the advancing unit (3) which is fixed to the main frame. For supporting CF in desired orientation and position in stationary manner, preferably suitable holder/s or clamping units (not shown) are used and mounted on the main frame. Thus, the sub-framework is movable relative to the main framework.

In this add-on weaving device, it is preferable that the shedding (1) and preferably the paired weft inserting units (2) are maintained in a mutually constant positional relationship in the movable sub-framework so that they can be jointly moved in desired up-down and left-right directions as and when required while their collective movement in forward-backward directions from a given position is changed by the advancing unit (3) in relation to the stationary under-production 3D fabric item (K) which is held in its clamping supports (not shown). Thus, the shedding (1) and paired weft inserting (2) units are preferably supported on a common movable sub-framework (not shown) which is attached to the advancing unit (3). Additionally, the mounting of the shedding unit (1) in the sub-framework is preferably such that the shedding unit (1) and weft inserting unit (2) can be independently displaced, repositioned and angularly oriented within the sub-framework, as and when required, relative to the stationary CF.

Relevant details of the shedding (1), weft inserting (2) and advancing (3) units are individually described next. Only the most fundamental working aspects of each of these units are described here as the required objectives can be practically realized in many different ways.

Shedding Unit:

As indicated earlier, the important novel aspects of the shedding unit (1) indicated in FIG. 2 are that it can create either a paired shed (L and N), each of which occurs at either face sides of CF, or a non-paired/single shed which occurs at only one face side of CF. A non-paired shed is employable, for example when producing an L-shaped beam-like profile which has the flange at only one side of the web.

For producing 3D fabric items the warps (P) are supplied preferably from above the fabric being produced such that they are oriented at an angle, preferably about 90°, to the surface/plane of the fabric (A) being woven. As a consequence, during shedding operation the displacement of warp yarns happens in the length direction of the woven fabric being produced. This manner of supplying and displacing warp yarns for shedding besides a CF is unlike that in known weaving processes wherein the warp yarns are more or less supplied in line with the produced fabric and the displacement of the warp yarns during shedding operation is in the thickness direction of the fabric being woven. Use of CF, along with warp yarns and weft yarns, is not known in traditional weaving processes.

In the novel add-on weaving method disclosed herein, the indicated orientation of and shed forming by the shedding unit (1) uniquely allows: (i) CF to pass through between its special arrangement of healds (to be described soon), (ii) creation of a paired shed (L and N) at either face sides of CF, and (iii) its working (to be described soon) to advantageously enable accomplishing two of the three primary weaving operations simultaneously, namely shedding and aligning the inserted wefts at fabric-fell, i.e. it also performs the "beating-up" operation.

In FIG. 3a is shown one example of the shedding unit (1) to essentially explain the working principle of shedding operation according to the present invention. The exemplified shedding unit (1) is mainly composed of a pair of shafts (11a and 11b) and each of these shafts (11) bear a set of healds (12). This indicated arrangement is for producing the plain weave. The number of healds (12) in each of the shafts (11a and 11b) can vary, from being at least one heald per shaft, although for the purpose of describing the working of shedding unit (1) only two sets of healds (12a, 12c and 12b, 12d) in each of the shafts (11a and 11b) respectively are indicated in FIG. 3a. In alternative constructional arrangement of shedding unit (1) the movement of healds (12) can be controlled either individually or in required groups, for example, either wholly mechanically or electro-mechanically through use of suitable means such as cams, pneumatic cylinders, electro magnets etc. linked to either mechanical or digital programs.

Shafts (11) can be preferably constructed using either cylindrical/other suitably shaped rods or by joining a number of functionally shaped suitable sub-parts. For ease of explaining the construction of the shedding unit (1), the shafts (11) are represented here as cylindrical rods and the healds (12) as circular pipes, although these components in many different forms and constructions could be used as shall be described later. Depending on the width specification of the weaving machine, the shafts (11) are chosen to be of suitable length to accommodate the required number of pipes (12) to realize the required width of the woven material.

A multiplicity of preferably equally spaced holes, or any other suitable arrangement chosen, is arranged along the length of shafts (11a and 11b) to receive pipes (12). Depending on the 3D fabric item required to be produced, some of the holes in shaft (11) can be left blank or without receiving pipes (12). For explaining the principle, in FIG. 3a shafts (11) are shown bearing pipes (12) in each of the holes. The pipes (12) are securely held more or less parallel to each other in the provided holes, with the possibility of their axial adjustment through a suitable further construction of the shafts (11), which also allows removal of any desired pipe/s from the holes, for example to make it flexible to easily and quickly remove any of the pipes (12) whenever needed to make space for accommodating CF there between in accordance with the cross-sectional shape of the 3D fabric item to be produced.

The assembly of each of the shafts (11) and pipes (12) is suitably supported at the shaft-end sides. Each assembly of shaft-pipes is connected to suitable links (not shown) whereby each of the assemblies can be turned about the axis of respective shafts (11a and 11b) in T1 and T2 directions, and also moved up-down in U1 and U2 directions as indicated in FIG. 3a.

The equally spaced holes in respective shafts (11a and 11b) are preferably close enough to allow pipes (12) of the sets of shaft (11a and 11b) to mutually pass easily between and closely to each other and cross to create the shed when at least one of the shafts (e.g. 11a) is turned towards the other shaft (11b). Accordingly, the pipes (12a, 12b, 12c, 12d) occur alternately in the shafts (11a and 11b) when seen in direction D in FIG. 3a, and they appear to occupy the orderly sequential positions W, X, Y, Z respectively as indicated in FIG. 3a. The indicated alternate positioning of the pipes (12a, 12b, 12c, 12d) in the shedding unit (1) is to create the plain weave. Alternate positions of pipes (12) can be achieved by either suitable relative axial location of the shafts (11a and 11b), or by using shafts that are provided with suitably pre-arranged holes. FIG. 3b shows pipes (12a-12c and 12b-12d) respectively fixed to the two shafts (11a and 11b) for their alternate occurrence when viewed in direction D indicated in FIG. 3a. The shafts (11a and 11b) are shown to be relatively displaced in vertical direction (indicated U1-U2 in FIG. 3a). Although pipes (12a-12d) are shown to be relatively highly spaced apart in FIG. 3b for the sake of clarity in representation, in practice they will be close to each other.

Figure 4B:
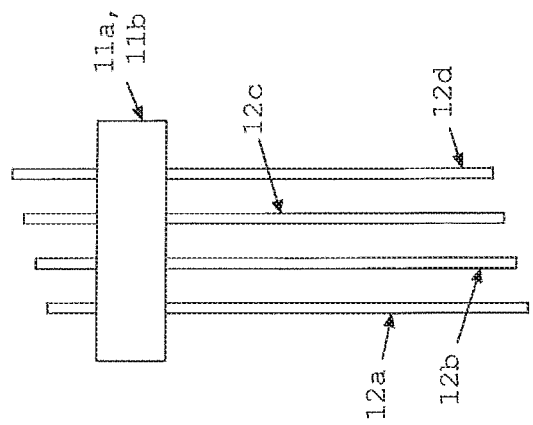
FIGS. 4a-4b exemplify an alternative disposition of certain components constituting the shedding unit/arrangement.
Figure 4A:
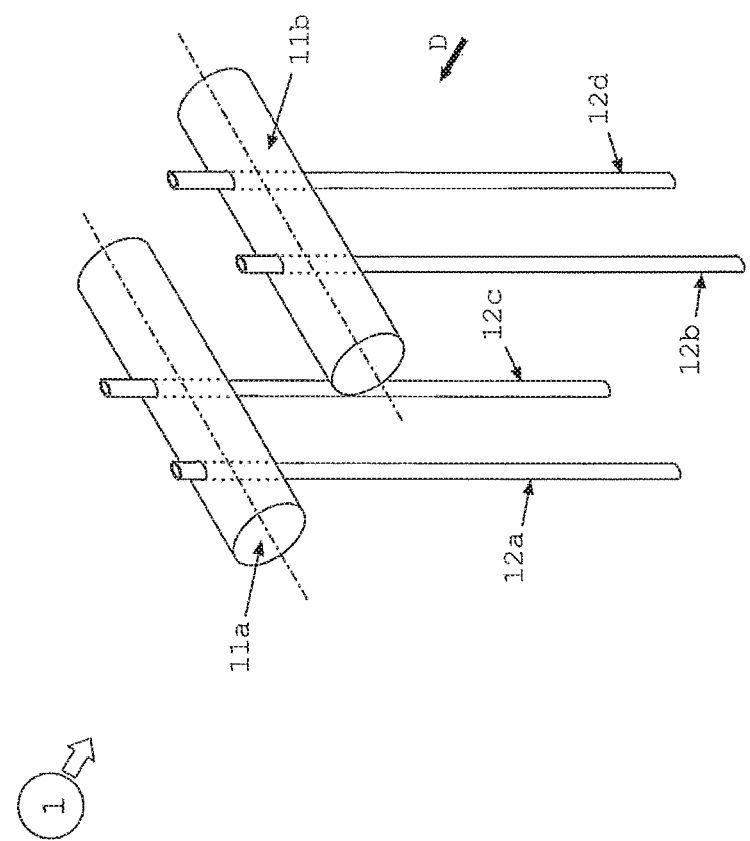

In FIGS. 3a and 3b the pipes (12a-12d) are shown to be of same lengths and in level with each other. However, pipes of unequal lengths could be as well used or, alternatively, pipes of same length could be arranged in different working lengths, or heights, (i.e. the length of pipes extending from shafts 11), as is shown in FIGS. 4a and 4b, to enable production of 3D fabric item comprising an inclined woven material in reference to the surface of CF. As can be noticed in FIG. 4b, which is a view in direction (D) indicated in FIG. 4a, the relative working lengths of pipes (12a to 12d) reduce according to the angle to be created to directly create a shed that will be inclined to a face of CF. Such an arrangement of varying lengths of pipes enables production of a woven material that is required to be directly inclined at a required angle relative to a face of CF, which could be either flat or curved. Inclining or tilting the entire shedding unit (1) comprising equal working length of pipes will not enable production of inclined woven material satisfactorily. Weaving a material directly at the required inclination, through use of varying lengths of pipes as described, relative to CF helps in eliminating any subsequent rearrangement of the woven material in relation to CF and thereby unnecessary disorientation of, and stress generation in, the fibers. As a result, the performance and reliability accorded by such a 3D fabric item increases.

The fundamental working of shedding unit (1) is described now in reference to FIGS. 5a-5d, which shows the side view of the working and represents one working cycle. It may be noted that the working of shedding unit (1) described here refers to plain weave. Also, the set of heald pipes on each of the shafts (11a and 11b) are represented by showing only the visible front two heald pipes (12a, 12b), for simple representation, as the remaining heald pipes are behind them.

In FIG. 5a is shown the shedding unit (1) with both shafts (11a and 11b) at level position (H) and the constituent sets of pipes (12a and 12b) in vertical orientation. Next, as shown in FIG. 5b, shafts (11a and 11b) are displaced vertically with shaft (11a) moving down and shaft (11b) moving up relative to level position (H) and the two shafts (11a and 11b) are turned in anti-clockwise and clockwise directions respectively. As a consequence, the two sets of pipes (12a and 12b) cross each other. The shafts (11a and 11b) are next reverted to their level position (H) and turned in the opposite directions to reposition the sets of pipes (12a and 12b) in their vertical orientation as shown in FIG. 5c. Next and finally, as shown in FIG. 5d, the shafts (11a and 11b) are displaced vertically with shaft (11a) moving up and shaft (11b) moving down relative to level position (H). The shafts (11a and 11b) are not turned and the sets of heald pipes (12a and 12b) continue to remain in their vertical orientation. The non-turning of shafts (11a and 11b) at this position to cause crossing of warp yarns to create shed will become clear later when a complete weaving cycle is described.

It is pertinent to consider here certain practical aspects of the novel shedding system which constitutes the heart of the add-on weaving method. Depending on the weaving requirements, for example those relating to count of warp yarns to be processed, spacing between warp yarns, spacing between layers of produced fabrics, and stiffness, brittleness, compactness and surface characteristics of the warp yarns to be processed, the angle of woven fabric to be produced relative to surface of CF, angle of weft to be incorporated in woven fabric relative to CF etc., the shedding unit (1) and its healds (12) could be suitably designed and constructed.

For example, the healds could be of either linear and rigid type or linear and bendable type through use of a knee-like bending arrangement. They could be either of tubular or wire-like or flat type in their build, or partly of some combination of these build types. The tubular healds could have preferably either circular or oval-like or rectangle or square cross-section among others. The wire-like healds could be preferably either in straight, or curving, or coiling (like a compression or extension spring), or combination of some of these forms among others. The flat type healds could have their body in preferably either rectangle-like or trapezoidal or convex or concave or part combination of some of these shapes among others. Further, the body could be either solid or with suitably shaped openings to reduce weight.

Depending on working space requirements the healds could be operated individually, or in group/s or collectively in either linear or angular reciprocation, or suitable combination of both. Accordingly, the reciprocating movements of healds could be either along their longitudinal axis, or transverse axis directions (like a pendulum's swing), or a combination of both these axes directions, i.e. reciprocation of either linear, or rotary, or linear-rotary combination types.

Further, the reciprocating movement of the healds could be of either positive or negative types. Also, their reciprocating movement could be performed either mechanically or electro-mechanically through employment of suitable programs. The healds could be reciprocated from the programmable driving unit either directly or indirectly through suitable connecting members.

Further, the healds could be of either stiff/rigid, or flexible, or semi-rigid/flexible type constructions. Each heald could be provided with either one or more than one openings, each of such opening having smooth/polished edges, for safe passage of the warp yarn. Further, the healds could be provided with either suitable guide wires or bars, with or without hard-wearing coating or members such as ceramic eyelets.

Weft Inserting Unit:

The processing of a CF together with warp yarns (P) and weft yarns (G), as indicated in FIG. 2, for manufacturing a 3D fabric item makes this add-on weaving process novel. The weft yarns (G) are required to pass through the paired shed (LN) and penetrate through the CF to achieve mutual through-thickness connection between CF and interacting woven material (A) that is produced by interlacing the wefts (G) and the warp yarns (P). The produced 3D fabric item thus has the CF and the woven fabric (A) mutually integrated in their respective thickness directions at the junction where they intersect. The weft insertion operation is performed by a representative unit (2) indicated in FIG. 6. It may be mentioned here that particular details of the means for performing weft insertion are considered unrelated to the scope of the present inventions. It is considered here for the purpose of demonstrating the practical viability of the novel add-on weaving process.

As indicated earlier, the weft inserting unit (2) has a constant positional relationship with the shedding unit (1). Both these units (1 and 2) are mounted on a sub-framework (not shown) which can be moved by the advancing unit (3) depending on the type of 3D fabric item being produced (i.e. linear, angular/circular, combination types). The number of weft inserting units (2) that are operationally required corresponds with the number of shedding units (1) actively employed. Thus, for every shedding unit (1) there is provided a weft inserting unit (2). As shown in FIG. 6, it essentially comprises a weft transporting element (2a), a weft guiding element (2b) for preferably linear traversal of element (2a), and a means (2c) for driving the transporting element (2a). Guiding elements (2b) at either sides of CF are commonly supported on a platform (2d).

Accordingly, the weft transporting element (2a) is preferably either a needle such as that commonly used for hand stitching/sewing or a hooked needle such as that usually used in knitting machines. In some situations, for example when manufacturing relatively complex 3D fabric items, use of fine, small diameter pipes with tapered end or suitable wires that are folded like hair-pin could be also considered, either independently or in conjunction, or tandem, with any other mentioned transporting elements. The type of weft transporting element (2a) chosen influences the selection of the type of means (2b) for guiding weft and means (2c) for driving weft. They could be either paired type or single type.

In FIG. 6 the means for transporting weft (2a) is represented by a common stitching needle of suitable length having one eye at an end side for receiving weft (G) to be laid in the shed. The weft guiding element (2b) is essentially a support that ensures linear traversal of transporting element (2a) between paired sheds as it has to traverse from one side of CF to the other and penetrate through CF as well. The guiding element (2b) also ensures that weft transporting element (2a) traverses at the required height into the created shed so that it can pass clearly from one shed to the other while also passing through CF that exists between the paired sheds. This is achieved, for example by mounting the paired guiding elements (2b) on a common platform (2d), which itself is part of the sub-framework (not shown). Weft transporting element (2a) is driven alternately by means (2c) which can be chosen from a selection of different possibilities depending not only on the relative complexity of 3D fabric item to be produced, but also the amount to be produced. For example, to produce a relatively complex item for a trial it might be appropriate to drive element (2a) by hand (2c) as is indicated in FIG. 6 for enabling insertion of weft (G) in the shed and through CF. The paired drive elements (2c) function both as giver and taker of weft transporting element (2a). For regular production, drive element (2c) possibilities such as robot, pneumatic cylinders, tangential drive wheels, spiked drive wheels, magnetic drives, clamping drives, combination of some of these, etc. could be considered. When the weft transporting element is of the hooked needle type, it could be as well connected to its driving element, either directly or indirectly, so that hooked needle element can be reciprocated linearly in and out of the single or paired sheds and penetrate through CF from one end side of the shed. Of course the hooked needle will be also suitably positioned at the required height for entry into the shed, and lay doubled wefts.

In accordance with the type of weft inserting element (2a) used, weft (G) could be laid either in singles or doubled/folded. As is well known in the field, with singles weft, the length that can be processed is limited by handling capacity of the system concerned, and with doubled weft, the length that can be processed is relatively substantially large. The selection of weft insertion element (2a) type will depend on, among others, the production length, complexity, performance requirements and finish characteristics of the 3D fabric item under consideration.

With use of element (2a) in the form of stitching/sewing needles, which can have either one pointed end or both ends pointed with the eye in between, wefts will be laid in singles. Such needles could be preferably of cylindrical and flat types. When using flat type needles, they could be either solid or have a series of perforations for being driven by suitable driving element (2c). With use of hooked or knitting needles, wefts will be laid doubled/folded. Further, when wefts (G) are to be laid in singles, as enabled by the set-up shown in FIG. 6, then a pair of weft guiding elements (2b) and a pair of driving elements (2c) will be located at either shed ends (or face sides of CF) and used to alternately perform insertion of weft (G) from the two sides. When doubled wefts (G) are to be laid, then a single weft guiding element (2b) and a single driving element (2c) will be used from one shed end (or face side of CF). It may be mentioned here that in this case use of weft guiding element (2b) might not be necessary if the position of driving element (2c), to which weft transporting needle (2a) is connected, remains fixed and the width of woven material to be produced is relatively small.

As mentioned earlier, the weft inserting unit (2) and shedding unit (1) are mounted on a sub-framework of the add-on weaving machine. This is done to maintain a constant positional relationship between them. Thus if the shedding unit (1) is raised/lowered relative to CF, the weft inserting unit (2) is as well correspondingly set, either directly of indirectly depending on the construction employed. Similarly, if the orientation angle of shedding unit (1) is changed relative to the surface of CF, the orientation angle of weft inserting unit (1) is also correspondingly changed. As will become clear later, the change in orientation angle of the shedding and weft inserting units (1 and 2) is also required for incorporating wefts (G) in a bias orientation relative to surface of CF. When wanting to produce a 3D fabric item comprising angled woven fabric relative to the surface of CF, in conjunction with shedding unit (1) in which the healds (12) are of different working lengths, as shown in FIG. 4b, the paired weft guiding and driving elements (2b and 2c) will be correspondingly raised at one side and lowered at the other, in addition to their angle being turned to match with the angle of shed formed by different working lengths of heald pipes (12). This way the traversal path of weft transporting element (2a) is ensured to remain linear in that direction.

The fundamental working of weft inserting unit (2) can be described now in reference to FIG. 6. After the shedding unit (1) and weft inserting unit (2) are set in desired positions relative to CF and in accordance with the 3D fabric item to be produced, their positional relationship becomes constant. The weft yarn (G) is threaded through the eye of needle (2a), which is the transporting element (2a), and a suitable length of weft (G) is cut after drawing it from its source. After the shed has been formed by the shedding unit (1), not shown in FIG. 6, needle (2a) is placed into guiding element (2b) located at one side (right side in FIG. 6) of CF. The needle (2a) is next pushed forward in the direction of CF by driving element (2c). The needle (2a) penetrates or pierces through CF and emerges from the other side (left side in FIG. 6) of CF and enters into the guiding element (2b) located at the corresponding side of CF. Depending on the length of needle (2a) used, it could span between the two oppositely located guiding elements (2b). It is drawn out of CF linearly while still on the guiding element (2b) located on the left side. Needle (2a) is then removed from its guiding element (2b) located on the left side and weft yarn (G) is pulled through the paired shed and CF, laying a length of weft yarn in the paired shed. Next, after the subsequent shed is created, needle (2a) is traversed, as described in the foregoing, but in the opposite direction, i.e. from left to right side in FIG. 6. The inserted weft (G) is pulled to bind with the warp yarns (not shown in FIG. 6) and form a naturally bound selvedge at the opposite side, completing a cycle of weft insertion.

Following the working outlined above, a skilled person in the art will understand now that handling and traversing of weft transporting needle (2a) could be performed in an automated manner using suitable techniques such as robots, pneumatic cylinders, tangential drive wheels, spiked drive wheels, magnetic drives, clamping drives etc. A combination of some of these could be also considered.

When wanting to produce 3D fabric items using doubled wefts, two alternatives could be considered. Whereas by the first possibility a single hooked needle could be used and operated as is usually done from one face side of CF, by the other possibility two oppositely placed hooked needles could be used and operated alternately from both face sides of CF. The choice of approach to be adopted would be influenced by factors such as yarn material type being processed, level of finish required and of course effect on performance of the resulting interlooped bindings created at the longitudinal edge/s (i.e. selvedge/s). When inserting weft from one side of CF the looped bindings will exist at one side, and "locked loops" as usual at the other side, which will create an unbalanced structure compared with when doubled weft is inserted alternately from both sides of CF.

Advancing Unit:

Processing a CF, along with warp and weft yarns, by this innovative add-on weaving process requires a novel advancing system to enable satisfactory successive insertions of wefts. Presence of a CF in weaving process is a completely new situation not encountered earlier. Given that CF used in the process can be of different shapes and limited dimensions in accordance with the 3D fabric item required to be produced, add-on weaving is not performed using conventional rolling type fabric take-up or advancing systems. As will become clear soon, a new approach is required to enable add-on weaving.

To practically enable successive insertions of wefts satisfactorily when processing a CF, warp yarns and weft yarns, it is preferable to have a system that in some situations while allowing CF to remain stationary or at a constant position, causes the shedding and weft inserting units to jointly change positions relative to CF. In other situations it might be desirable to turn CF about an axis while keeping the units in one position, for example when CF is circular in shape. In some other situation CF might be required to be maintained stationary at some positions and turn axially or move linearly at other positions while the shedding and weft inserting units are jointly turned/moved or kept stationary. Yet in some other situation CF might be required to turn/move and the shedding and weft inserting units are also required to jointly move, for example when wanting to produce certain interacting woven materials in diagonal orientation relative to an edge of the CF being used.

An advancing unit (3) described below is novel in that it offers the various possibilities mentioned above to directly create endless types of 3D fabric items by bearing either the sub-framework which houses the shedding and weft inserting units or supporting the CF in a manner to allow its turning/rotation about an axis. Some examples of the 3D fabric items producible through use of this advancing unit (3) will be indicated later in reference to FIG. 14 after describing its fundamental working.

Figure 7A:
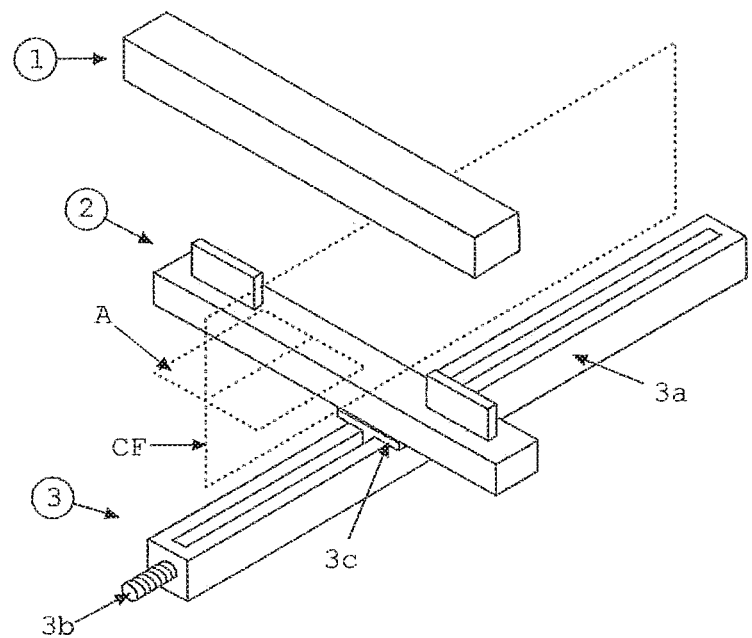
FIGS. 7a-7d exemplify the main components of and their relative organization in the advancing unit/arrangement that is suitable for producing 3D fabric items in one of X, Y and Z orientations.

In FIG. 7a is exemplified an advancing unit (3) and its relative position to shedding unit (1) and weft inserting unit (2), both of which are housed in a sub-framework (not shown). Advancing unit (3) is essentially composed of a frame (3a), a driving member (3b) and a support (3c). The frame (3a) is preferably a part of the main framework of the add-on weaving device, and therefore a fixed member. Frame (3a) can be either of linear type as shown in FIG. 7a, or non-linear/curvilinear type or of a particular shape (e.g. circular, square-like, odd shaped etc.) suited for producing the desired 3D fabric item. Driving member (3b) is preferably supported by frame (3a) through suitable supports and links. Driving member (3b) can be of different types such as a threaded rod, timing belt, rack-pinion gears, worm gears, sprocket-chain, cables, some of these combinations etc. The choice of driving member to be used will depend on the type of frame (3a) used and on the shape of 3D fabric item required to be produced. It will also depend on other factors of machine construction like load of sub-framework together with shedding and weft inserting units to be moved, dimensions and shape of CF being used, manner in which CF is to be supported etc. Support (3c) is connected to drive member (3b) as well as to the sub-framework (not shown) which bears the shedding (1) and weft inserting (2) units. Thus, support (3c), driven by driving member (3b), functions to traverse the sub-framework, and thereby the shedding and weft inserting units jointly in relation to CF. Further, support (3c) is preferably guided and supported on suitable bearings (not shown) fixed to the main framework so that the intermittent movement of sub-framework is smooth and it gets positioned accurately during production of 3D fabric item. This described arrangement is suitable for producing 3D fabric items of linear, circular, tubular, differently-shaped, some of their combinations etc. forms. In FIG. 7a is shown production of a linear type profiled 3D fabric item having "+" cross section and composed of CF and woven fabric (A). The supports for holding CF linearly on the main framework are not necessary to indicate and are hence not shown.

Figure 7B:
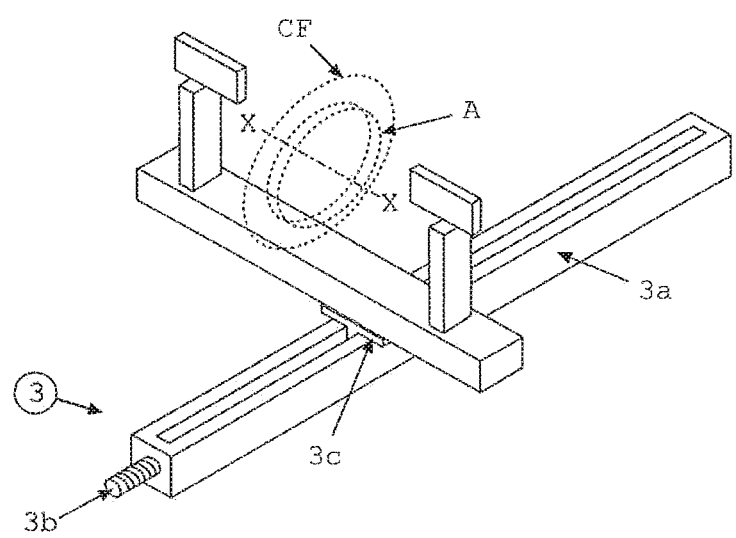
Figure 7C:
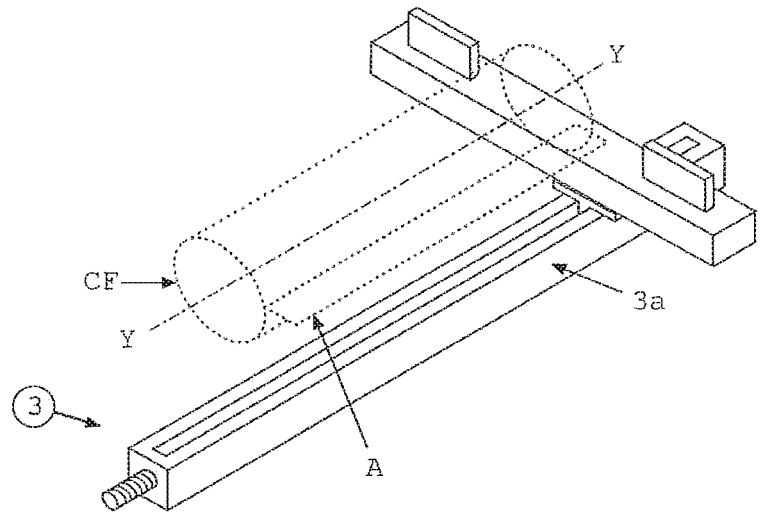
Figure 7D:
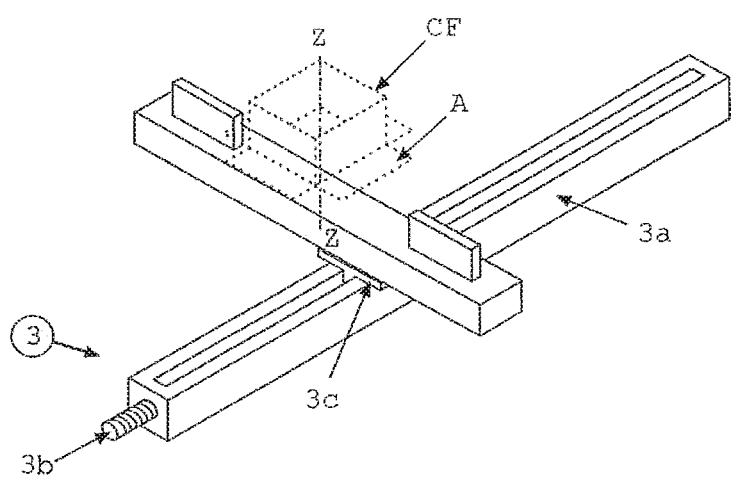

When required to produce circular, tubular etc. types of 3D fabric items, support (3c) could be suitably modified to additionally support CF by suitable means in a way that the circular, tubular etc. types of CF can be turned or rotated about an axis. The drive to turn/rotate the supported CF could be got either from driving member (3b) or from an independent source such as a motor. FIGS. 7b-7d exemplify production of 3D fabric items by add-on weaving method using circular, tubular, square-like CFs respectively. A person skilled in the art will understand now how CFs could be located relative to different units of add-on weaving machine and the different possibilities of orienting their axis in either X or Y or Z directions. The 3D fabric item in FIG. 7b shows a flat circular CF positioned to turn about its axis X for the produced curved woven fabric (A) to project from one surface or face-side of CF. The 3D fabric item in FIG. 7c shows a tubular CF positioned to turn about its axis Y for producing linear woven fabric (A) that projects from the exterior surface of tubular CF. The 3D fabric item in FIG. 7d shows a square tubular CF positioned to turn about its axis Z for the produced linear woven fabric (A) to project at the base sides and at the exterior surface of square tubular CF.

It may be noted here that the spatial location of CF, whether linear or circular or tubular etc. remains fixed in relation to the main framework but they can be either held stationary in one position or moved/turned/rotated about an axis in one position. For example, the relative location of CF in FIG. 7a is fixed in one position. The CFs shown in FIGS. 7b-7d, while remaining at the same location relative to the main framework, are turned about an axis to enable production of corresponding 3D fabric items using either single or doubled wefts depending on the practical demands of the situation. The successive weft insertions are enabled by either advancing the sub-framework, which houses the shedding and weft inserting units (1 and 2), relative to CF, or turning the CF about an axis relative to sub-framework or by both advancing sub-framework and turning CF either regularly or intermittently.

As mentioned earlier, the described advancing unit (3) should not be considered limited to the indicated forms of parts (3a, 3b and 3c). Through suitable engineering a non-linear or curvilinear frame (for example circular, oval and rectangular with corresponding driving member and base support for supporting sub-framework could be used to produce, for example, a "+" cross-section beam-like profiled material that is not linear but curving. Depending on the complexity of the 3D fabric item to be produced, the sub-framework can be suitably supported by the support base on the curvilinear frame, and if required additionally supported from outside. For example, the sub-framework could have extra support from an extending arm that is connected to either a robot or to a stationary column in its radial direction so that the sub-framework can be freely moved supported over the curvilinear frame to change positions relative to CF for enabling successive weft insertions satisfactorily for producing 3D fabric items. For further functional flexibility of advancing unit (3), a cross member fixed to the main frame could be used to support frame (3a) to additionally enable movement of advancing unit (3) in lengthwise and cross-wise directions as well.

Having described the necessary aspects of the shedding (1), weft inserting (2) and advancing (3) units of the weaving device, their practical inter-working is considered below by exemplifying production of "+" and other relevant cross-section profiled 3D fabric items. Through the following description of the fundamental working of the various weaving units, it would become apparent to a person skilled in the art that endless types of 3D fabric items can be directly produced by this novel add-on weaving process.

Working of Various Units

A cycle of the add-on weaving process is described now in reference to FIGS. 8a-8d. In accordance with the cross-sectional shape and dimensions of the profiled beam-like 3D fabric item to be produced, the preparatory work involves removing select pipes (12) in the shedding unit (1) from their respective shafts (11) to accommodate the Complementary Fabric/s (CF) there between. In the present instance, to produce the "+" profiled beam-like 3D fabric item, CF will exist between a paired shed L/N (in FIGS. 8a-8d the shed (L) behind CF is not visible as only the side view of the process is shown). However, when producing cross-sectional shapes that have the flange/s occurring at only one face side of CF that constitutes the web, for example like "L" cross-section, then only pipes (12) at the required face side of CF can be had in the shedding unit (1) and the remainder of them can be preferably removed or rendered non-operational in different ways. In such a situation CF will not be accommodated between any pipes (12), but will exist at one of the end sides of the assembled pipes (12). Next, the shedding unit (1) and the weft inserting unit (2) are jointly positioned at the specified heights within the movable sub-framework which is supported on advancing unit (3) to weave and connect the woven flange part to CF at the required position. Presently, the woven part (A) is to be in a middle part of CF's width to obtain the "+" cross-section.

Warp yarns (P), drawn from their respective supply spools (not shown), and guided through respective tensioning devices (not shown), are individually drawn through each of the required heald pipes (12). The emergent fore-ends of warps (P) are secured in a clamp (not shown) fixed to the main framework. The desired CF of required shape and length and width dimensions is accommodated in-between the required heald pipes (12) as also the clamped warp yarns (P) emanating from heald pipes (12). The fore and aft ends of CF are suitably supported and clamped in a flat manner in the main framework. Alternatively, CF could be first secured in position and then the warp yarns (P) threaded through the heald pipes (12).

As shown in FIG. 8a, the weaving cycle starts with displacing the shafts (11a and 11b) in upward and downward directions respectively from the neutral position (H-H), and turning them about their respective axes whereby the paired pipe-like healds (12) create the shed (L/N) without crossing each other. The turning and upward displacements of heald pipes (12a), together with the tensioned warp yarns (P), causes the previously laid weft yarn to be pushed towards and aligned with the fabric-fell. Fresh weft (G) is inserted in the created shed (L/N) using suitable means for weft inserting (not shown).

Next, as shown in FIG. 8b, each of the shafts (11a and 11b) is brought to the neutral positions (H-H) whereby the paired pipe-like healds (12a and 12b) also assume corresponding level positions. Displacement of healds (12a and 12b) to neutral position H-H is preferably performed to enable release of the required length of warp yarns (P), which takes an L-shaped path between the interacting woven fabric (A) and the heald pipes (12), by jointly advancing the shedding unit (1) and the weft inserting unit (2) (as they are housed together in the sub-framework) in the direction shown by the arrow (D) to the required distance. Activation of the advancing unit (3) causes the joint movement of the sub-framework, and hence the shedding unit (1) and weft inserting unit (2) in a constant positional relationship, away from the just-inserted weft (G) whereby subsequent shed (L/N) can be created and successive weft can be inserted in the created shed.

Next, as shown in FIG. 8c, shafts (11a and 11b) are displaced in downward and upward directions respectively and turned about their axes towards each other. Consequently, the paired pipe-like healds (12a and 12b) cross each other creating the subsequent new shed (L/N). Again, the turning and upward displacements of heald pipes (12b), together with the tensioned warp yarns (P), causes the previously laid weft yarn to be pushed towards and aligned with the fabric-fell. Fresh weft (G) is inserted in the created new shed (L/N) using suitable means for weft inserting (not shown).

Once again, the shafts (11a and 11b) are displaced to the neutral position (H-H), as shown in FIG. 8d, whereby the paired pipe-like healds (12a and 12b) also assume corresponding level positions. As indicated above, displacement of healds (12a and 12b) to neutral position H-H is preferably performed to enable release of the required length of warp yarns (P), which takes an L-shaped path between the woven fabric (A) and the healds (12), by jointly advancing the shedding unit (1) and the weft inserting unit (2) in the direction shown by the arrow (D) to the required distance. This is achieved by activating the advancing unit (3) which causes the shedding unit (1) and weft inserting unit (2) to move away jointly from the just-inserted weft (G) whereby subsequent shed (L/N) can be created and successive weft can be inserted in the created shed.

As indicated above and observable from FIGS. 8a-8d, the warp yarns (P) take an L-shaped path from shedding heald pipes (12a and 12b) to the interacting woven material (A) which comprises these warp yarns (P). Also, the warp yarns (P) are displaced in the weaving or length direction of the woven material being produced. The produced shed (L/N) is thus oriented at an angle to the plane of produced woven fabric (A), and it is not in line with the plane of fabric (A).

The L-shaped path of warp yarns (P) uniquely eliminates the need for performing beating-up operation using a reed. This happens as the tensioned warp yarns that are closer to the just-laid weft yarn during shedding pushes and aligns the just-laid weft yarn towards the fabric-fell directly. As a consequence, the process of add-on weaving stands significantly simplified and rendered efficient.

Having described the working cycle of the add-on weaving process, it is pertinent here to present some other related aspects to bring forward the flexibility and versatility of this novel add-on weaving process.

Figure 9B:
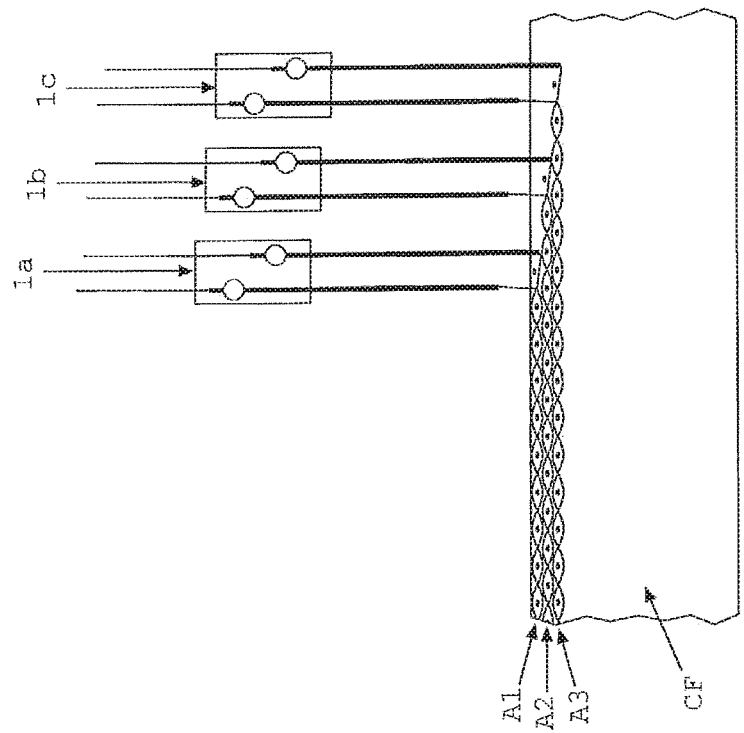
Figure 9A:
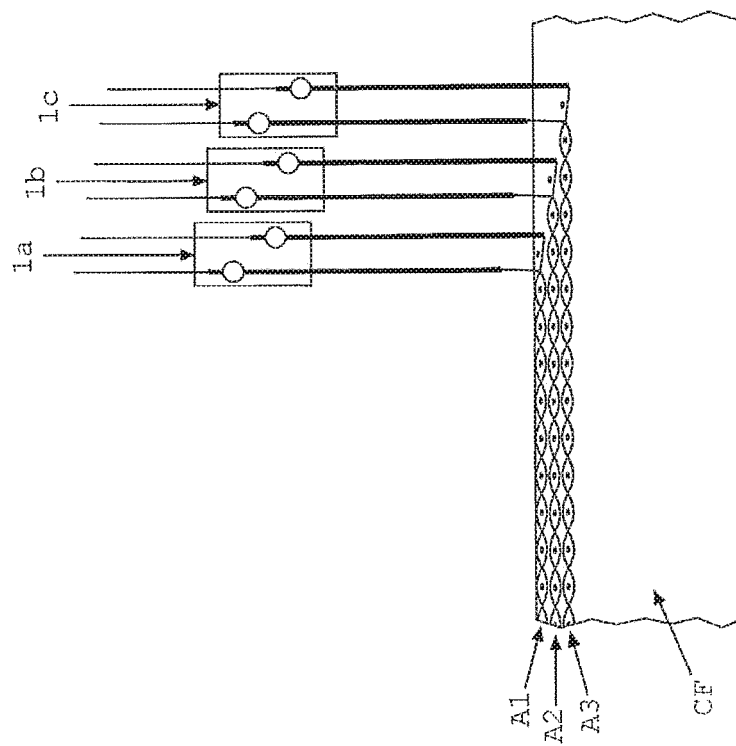

Whereas the above description refers to employment of shedding unit (1) to produce a flange that is single-layer woven fabric (A), in FIG. 9a is shown an arrangement wherein a series of three shedding units (1a, 1b, 1c) are used for producing a "T" cross-section beam-like profiled 3D fabric item with a flange that is composed of, for example, three layers of woven fabrics (A1, A2, A3). The number of woven fabric layers required in a flange corresponds with the performance requirements of the profiled beam-like 3D fabric item. These shedding units (1a, 1b, 1c) can be operated preferably simultaneously to create all the sheds at the same time and thereby achieve relatively faster weaving.

It may be pointed out here that the corresponding three sheds are (a) separated from each other along the length-direction of weaving, and (b) the three sheds are in different vertical step-like levels/planes to enable production of the three independent woven fabric layers of the flange. The length-direction separation of shedding units (1a, 1b, 1c) can be such that the created peaks and valleys of the crimping yarns of the different woven layers (A1, A2, A3) occur either facing each other, as shown in FIG. 9a, or facing oppositely, i.e. peaks in one fabric faces the valleys of the adjoining fabric, as shown in FIG. 9b. The latter construction is preferable for better nesting of fabric layers to obtain a better fibre distribution and a relatively compact or denser flange. In both these instances, shown in FIGS. 9a and 9b, it may be noted that the three shedding units (1a, 1b, 1c) are oriented in the same direction.

FIG. 9c indicates employment of two sets of shedding units (1a, 1b, 1c and 1d, 1e, 1f), for example when producing two flanges of a profiled beam-like 3D fabric item such as that having the "I" cross-section. The two sets of shedding units in FIG. 9c are arranged on the same edge side of CF (top, in FIG. 9c) to produce corresponding fabric layers (A1, A2, A3 and A4, A5, A6) as the upper and lower flanges of the "I" beam-like profile. Again all the shedding units are oriented in the same direction. This arrangement could be also modified whereby the two sets of shedding units (1a, 1b, 1c and 1d, 1e, 1f) can be had oppositely facing each other as shown in FIG. 9d, i.e. located at the top and bottom edge sides of CF and oriented in opposite directions (i.e. facing each other).

Figure 9E:
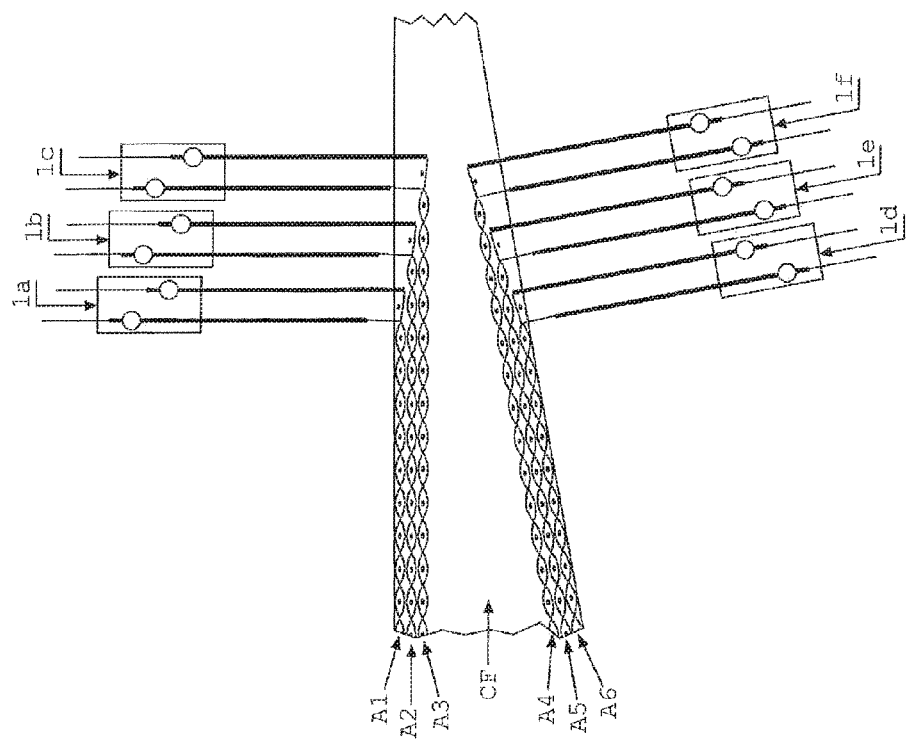
Figure 9D:
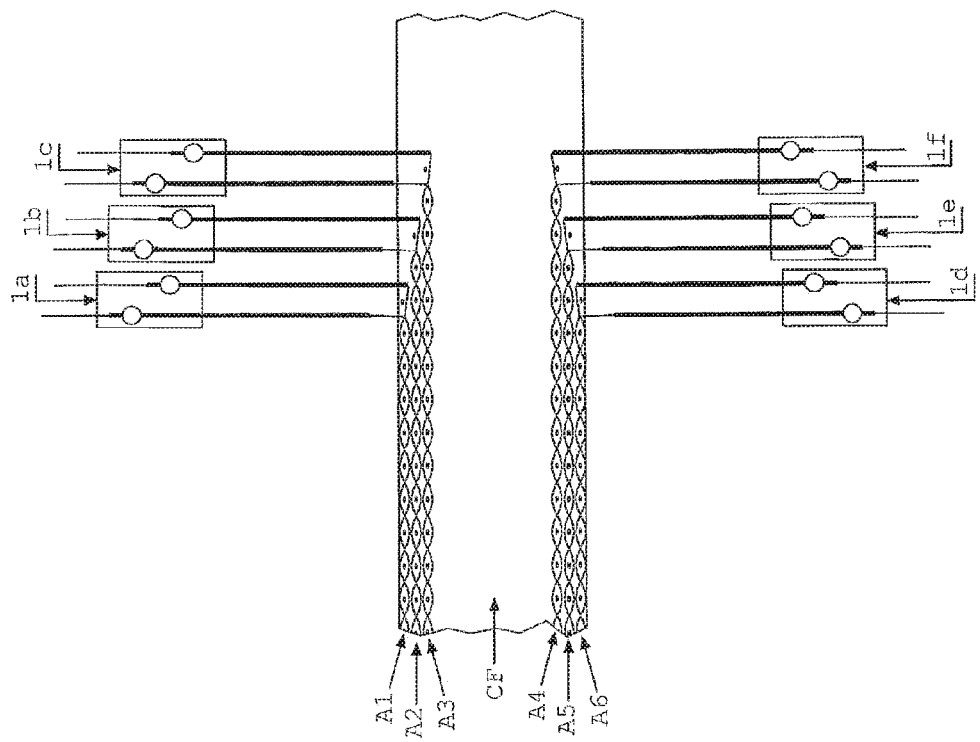
Figure 9F:
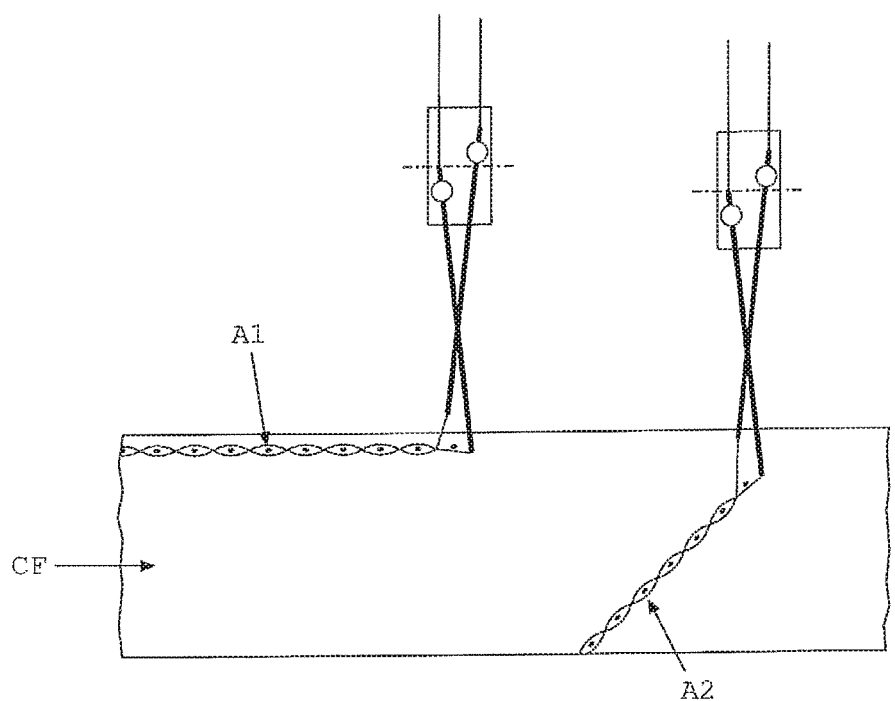

The two sets of shedding units (1a, 1b, 1c and 1d, 1e, 1f) indicated in FIGS. 9c and 9d are shown to be arranged in parallel. However, they could as well be had in a mutually angular configuration as shown in FIG. 9e, to produce, for example, a profiled beam-like 3D fabric item that narrows or tapers from one end to the opposite. Non-parallel woven materials can be also directly produced and connected with CF, as shown in FIG. 9f, by suitably displacing a shedding unit in a gradually inclining manner while maintaining it parallel to another shedding unit during the add-on weaving process. As shown in FIG. 9f, while woven fabric (A1) is produced parallel to the edge of CF, the woven fabric (A2) is produced at an angle to fabric (A1), or slanted in relation to an edge of CF.

Further, the construction and orientation of the shedding unit (1) presented above, for explaining its basic working principle, has been shown to be arranged for creating a shed that is oriented 90° to the surface of CF. However, it is also possible to create sheds that are oriented at an angle other than 90° to the surface of CF. Through suitable designing and constructional engineering, the shedding unit (1), and thereby the healds (12), can be arranged to create a shed which is oriented at an angle, for example 30°, 45°, 60°, 75° etc. to the surface of CF as shown in FIG. 10a.

For ease of representing the idea, FIG. 10a shows the top views of two shedding units (1g and 1h) located above the top edge of CF. These shedding units (1g and 1h) are oriented in mutually opposite angles +θ° and −θ° in reference to the surface of CF for creating sheds that are oriented at an angle other than 90° to the surface of CF. The shedding units (1g and 1h) enable production of corresponding fabrics (A1, A2) at relatively different levels. Such orientations of shedding units (1g and 1h) are advantageous for weaving 3D fabrics items with flanges (or webs) comprising weft yarns oriented in bias orientations +/−θ° in the woven fabrics (A1 and A2) in reference to the faces of CF as indicated in FIG. 10b. If required, more than one pair of mutually oppositely oriented shedding units like (1g and 1h) could be arranged and used for weaving corresponding number of fabric layers with bias orientation of wefts in the flange of a 3D fabric item. The flange/s of a 3D fabric item comprising yarns oriented in mutually opposite bias +/−θ° directions will naturally offer relatively increased resistance to shear deformation.

Figure 11A:
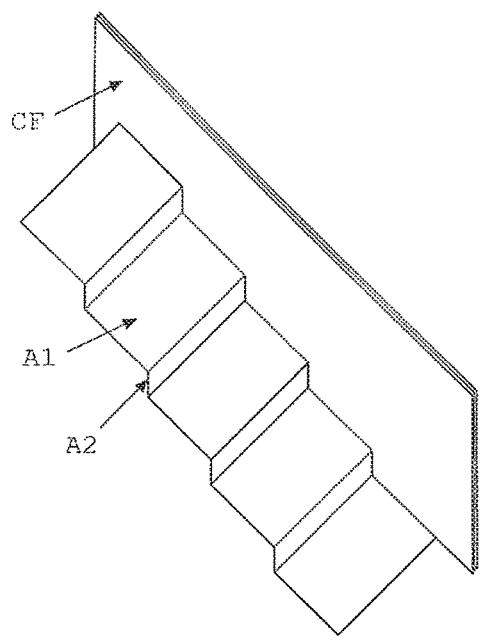
FIGS. 11a-11e exemplify some 3D fabric items producible by different organization of shedding units/arrangements.
Figure 11B:
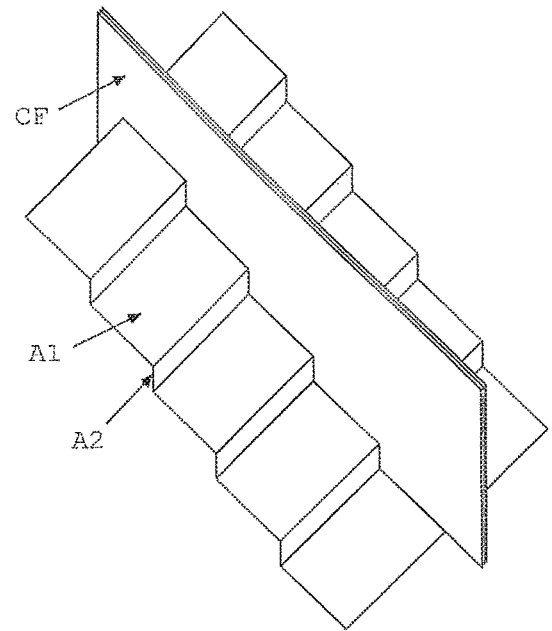

It is pertinent to indicate here that the shedding unit (1) could be modified in many different ways with regard to its construction and mounting arrangement. Further, the construction and mounting arrangement of shedding unit (1) could also be made such that a unit could be deployed in two mutually angular planes, such as horizontal and vertical, to produce directly corresponding woven materials. As shown in FIG. 11a, step-like woven fabric (A1 and A2) is produced and linked to CF. Such horizontal and vertical step-like woven materials (A1 and A2) could be produced at either one face side of CF, as is shown in FIG. 11a or at both face sides of a CF as is indicated in FIG. 11b. Step-like woven materials (A) is also producible between opposite faces of two CFs as is indicated in FIG. 11c.

Figure 11C:
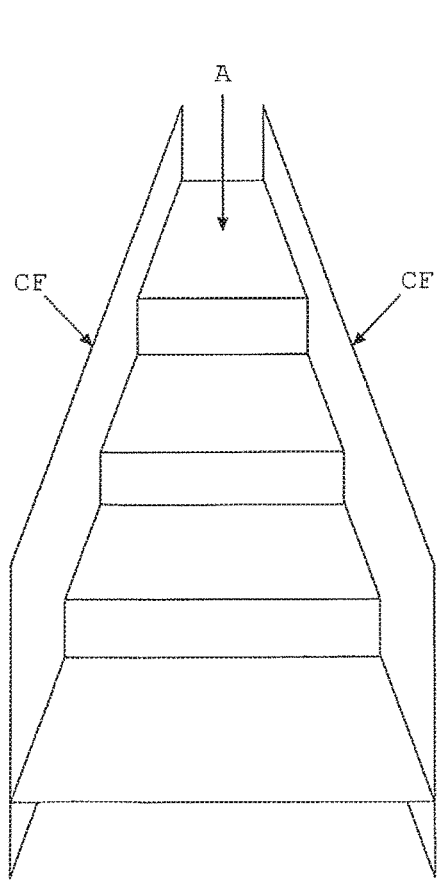
Figure 11D:
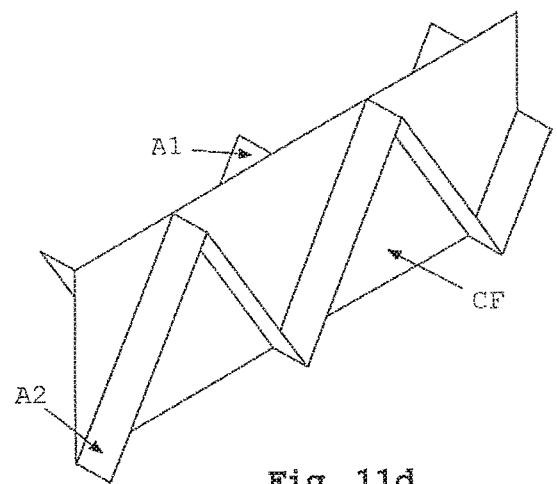

Zigzag woven constructions (A), which are step-like, as shown in FIG. 11d, could be also alternatively produced by suitably gradually moving the shedding (1) and weft inserting (2) units diagonally in a joint manner in predetermined ordered sequences as weaving progresses from one end of CF to the opposite. Such zigzag interacting woven fabrics (A1 and A2) could be produced at either one or both face sides of CF. Further, these zigzag woven fabrics (A1 and A2) could be produced in either same phase or off set from each other by some distance or in opposite phases; the last mentioned construction being indicated in FIG. 11d. Similarly, and needless to emphasize, a person skilled in the art will understand now that the zigzag woven fabric could be also produced as sine curve-like constructions (A1 and A2) shown in FIG. 11e. These integrated step-like, zigzag and sine-curve like woven constructions function as stiffening ribs for the CF. It may be noted that the zigzag woven fabric need not necessarily span the top and bottom edges of CF as is shown in FIG. 11d. Also, the peaks of woven zigzag and sine-curve fabrics can be at different heights relative to the edge of CF, and not necessarily at the same height as shown in FIGS. 11d and 11e.

Figure 11E:
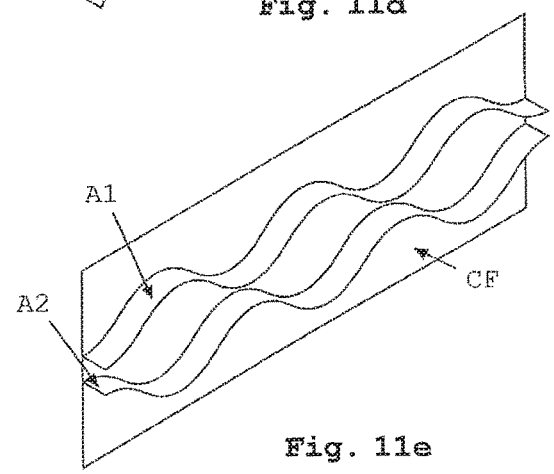

Whereas the zigzag bearing 3D fabric items shown in FIGS. 11d and 11e could be produced using one pair of shedding units, the step-like bearing 3D fabric items shown in FIGS. 11a-11c could be produced using two sets of shedding units which work in mutually angular planes. These different aspects of producing 3D fabric items are highlighted here to bring forward the versatility of the novel add-on weaving method.

Figure 12A:
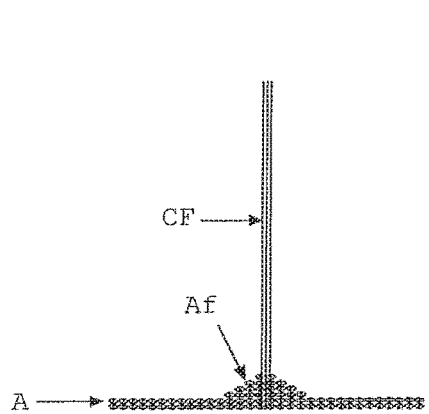
FIGS. 12a-12b exemplify filleted and tapered constructions of 3D fabric items producible by the add-on weaving process.
Figure 12B:
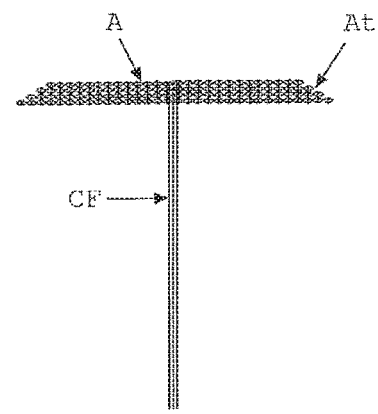

A person skilled in the art will understand now that by using select healds in gradually increasing (or decreasing) numbers in each shedding unit, a variety of 3D fabric items can be produced wherein interacting woven materials of relatively increasing (or decreasing, depending how it is viewed) widths are created. Such different widths of woven fabrics when made at the corner/s of the web and flange, creates a filleted or "rounded" corner (Af) as shown in FIG. 12a. Inclusion of such varying widths of woven materials at the web-flange corner/s not only strengthens the web-flange intersecting joint, but also prevents concentration of forces/loads at the corner/s whereby performance of such 3D fabric items is improved. Likewise, by using select healds in gradually increasing (or decreasing) numbers in each shedding unit, woven materials of different widths can be created at the longitudinal edge/s of the web and/or flange to render the construction of flange's longitudinal edge/s tapered (At) as shown in FIG. 12b. Producing tapered surface/s by including such varying widths of woven materials at the longitudinal edge/s again helps in preventing concentration of forces/loads at the edge/s whereby performance of such 3D fabric items is improved.

Additional Aspects

In the foregoing, the important aspects of novel add-on weaving method have been described. To practically perform add-on weaving in a satisfactory manner some additional aspects are considered below. Accordingly, these aspects are important constituents of the add-on weaving process.

(a) Arrangement for Maintaining Woven Fabric's Width

The angular supply of warp yarns (with respect to the produced interacting woven fabric's surface) can cause generation of tensions in them during fabric advancing operation and weft tensioning operation. As a consequence, the woven fabric being produced can become either narrower or uneven in width. To overcome this problem, use of a clamping system to maintain the width of the produced woven fabric consistently, akin to use of temples in traditional weaving, is required. A clamping arrangement for maintain the width of woven fabric therefore constitutes this add-on weaving process.

Figure 13A:
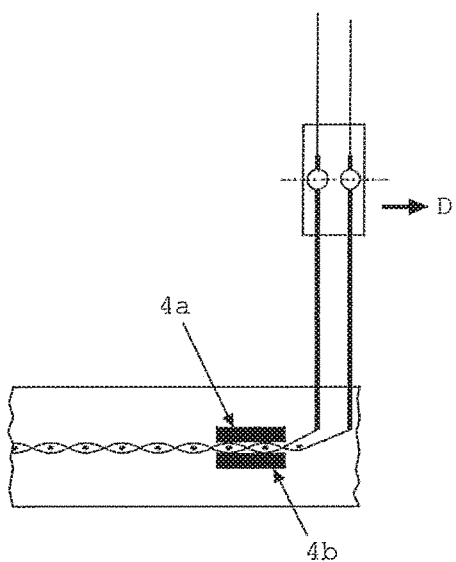
FIGS. 13a-13b exemplify relative location of the clamping unit required for preventing narrowing or maintaining constant width of woven fabric.
Figure 13B:
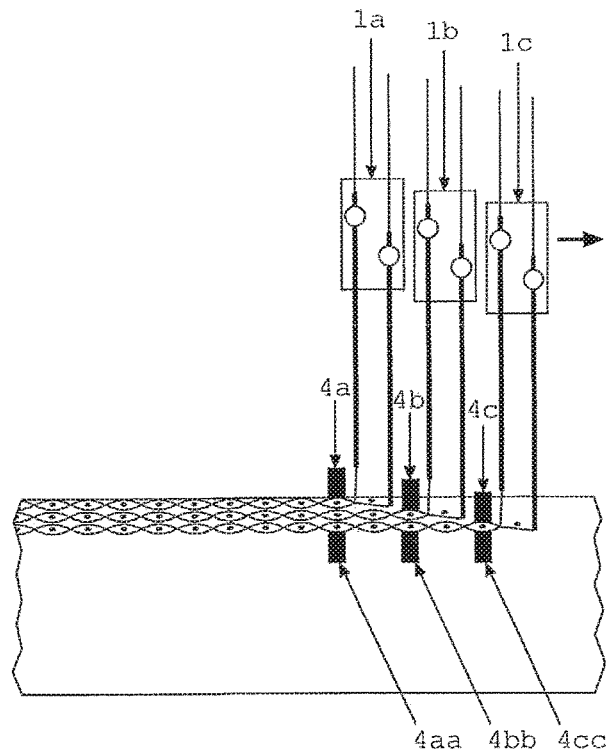

In FIG. 13a is shown the fabric clamping unit (4) and its relative working position. At least one of the jaws (4a and 4b) of clamping unit (4) is displaceable so that the fabric between the jaws (4a and 4b) can be held firmly by pressing the two jaws against each other. Likewise, the fabric can be released by moving the jaws (4a and 4b) away from each other. The woven fabric is kept pressed between the jaws (4a and 4b) close to fabric-fell position during advancing or onward movement of the sub-framework in the direction of arrow (D) so as to correspondingly draw out the warp yarns without causing the produced woven fabric to become narrow. After advancing operation is completed, the clamp jaws (4a and 4b) are then moved away from each other and the fabric released. Subsequently, the clamp jaws are moved back close to the fabric-fell position for clamping operation during the next cycle. The side surfaces of the clamp jaws (4a and 4b), which face the side where shed is formed, is preferably close to the fabric-fell of each of the fabrics being woven. Needless to state, the clamp jaws (4a and 4b), of suitable dimensions to serve the purpose at hand, are supported in the sub-framework and they can be mounted in different ways and operated pneumatically, mechanically, magnetically, electro-mechanically etc. A person skilled in the art will understand now that for each woven fabric layer being produced, use of a corresponding number of clamping units (4) would be desirable. Their relative locations would be as shown in FIG. 13b wherein pairs of clamps 4a-4aa, 4b-4bb and 4c-4cc are used to clamp the fabric layers independently and collectively.

(b) Arrangement for Withdrawal of Weft Yarn from Shed

Another aspect concerns withdrawal of the weft yarn/s trailing the needle that has been removed from the shed. In conjunction with the weft inserting method chosen (for inserting single or doubled wefts), a weft yarn clamping-and-pulling arrangement is incorporated and it is a constituent of this add-on weaving process. This arrangement can also be operated by pneumatic, mechanical, magnetic, electromechanical etc. means.

An example of weft yarn clamping-and-pulling arrangement (not shown) for use with singles weft essentially comprises a pair of suitable rollers that are brought into position and pressed against each other so that the weft yarn is pressed in between them after the needle emerges from the shed. These rollers are then driven in the required direction whereby the weft yarn gets tangentially driven until properly incorporated as weft in the fabric being produced. Suitable sensors command the rollers to stop at the correct position (as the length of yarn for wefts becomes shorter after every weft insertion) so that the length of weft incorporated in the woven fabric is always correct and equal.

Another type of weft yarn clamping-and-pulling arrangement preferably makes use of paired jaws or magnets which clamp the weft yarn emerging from the shed. These jaws or magnets are moved preferably linearly, for example by attaching it to a timing-belt of suitable length. The belt is run under sensor control to stop at the correct position after every weft insertion as the yarn length for wefts keeps reducing after every weft is incorporated in the woven fabric.

It may be pointed out here that when using hooked needles to insert doubled wefts, then the weft yarn can be passed through a clamping arrangement which is connected preferably to a pneumatic cylinder or a cam controlled reciprocating bar. Both these types of working bars provide a pre-set constant stroke length, to pull the continuous doubled-weft that runs between the woven fabric and its supply source.

(c) Weft Threading and Cutting

Working with relatively small lengths of singles weft yarns requires that its transporting needle be threaded with fresh length of weft yarn after certain number of insertions has been made with the same weft yarn. This could be time consuming. To overcome this situation, the weft transporting needles are preferably of the readily available self-threading type. An end side of a pre-cut length of weft yarn is positioned in the path of the needle such that the yarn exerts certain pressure on the needle. As the weft yarn passes over the eye of the needle, it slides into the special cut of the eye and gets automatically threaded in the eye. Use of such self-threading needles is a constituent of the add-on weaving process. After the weft has been threaded in the needle's eye, a suitably positioned means for cutting the weft yarn is activated to cut the required length of weft yarn. This situation does not arise when working with doubled wefts.

(d) Weft Insertion in Closed Shed

It is relevant to indicate here that in some situations to achieve constant width of produced woven fabric consistently and exercise better control over warp yarns during advancing operation, along with clamping of the woven fabric by unit (4) described above, it is beneficial to let the needle remain in the shed until the subsequent new shed is formed. Drawing out the needle entrapped by the warp yarns causes the weft yarn to be laid in the closed shed and thereby the structure acquires certain firmness. Drawing out weft yarn through a closed shed is a whole new approach not encountered earlier.

(e) Means for Clamping and Supporting CF for Weaving

The holding or clamping of CF in required position is achieved preferably by one or more of mechanical, magnetic, pneumatic means. The part on CF where weaving is to be performed is left free from any hindrances such as that might arise from the supporting members, which are thoughtfully pre-arranged. The clamping support is such that it allows either single or multiple CFs to be held in plain/flat, curving, bending, and such combination arrangements. It also allows clamping and supporting CFs that are of either regular or irregular forms, or tubular, with or without opening/s etc. Further, it can hold multiple CFs of either equal or unequal dimensions, either similar or dissimilar shapes, and in either relatively parallel or non-parallel or combination arrangements. Further, such a means can clamp and support CF in either stationary or linearly moving or angularly turning or rotating manner. Use of additional supports such as spacer bars and rings, for example when processing multiple CFs, could be considered for maintaining the different CFs in required distances and configurations. The means for holding or clamping and supporting CF are constituents of the add-on weaving process.

(f) Arrangement for Supplying CF

Figure 13C:
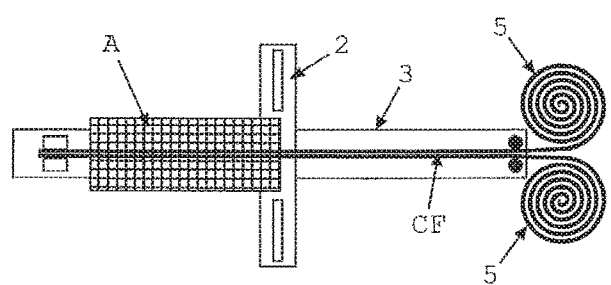
FIG. 13c exemplifies a top view of the add-on weaving process and relative arangement of some of different units.

In some situation when substantially longer lengths of linear type 3D fabric items have to be produced than the machine can directly produce within its dimensions, then preferably one or more rolls (5) of CF of required specifications can be used as shown in FIG. 13c, which shows a top view of the add-on weaving process and relative arrangement of some of different units. Such rolls (5) of CF can be mounted on a suitable spindle/holder or the like to obtain a supply of relatively longer CF in continuous length as indicated in FIG. 13c. For continuous production the leading end of CF is drawn from its supply source and clamped in its support on main framework while CF at the roll end side is also guided and clamped. Weaving is then performed using the warp and weft yarns to produce interacting woven fabric (A) which is integrated with CF to obtain the 3D fabric item. After a first length of 3D fabric item has been produced, CF is released from its clamps and a length of fresh CF drawn out from the supply rolls (5) without cutting it. The first produced length of 3D fabric item is correspondingly drawn out from the sub-framework and placed into a suitable receptacle/support (not shown in FIG. 13c) that is connected to the main framework. The newly released length of CF is then fixed in its support clamps and the sub-framework which houses the shedding and weft inserting units, along with other systems, is moved back to the starting position and weaving recommenced from the point where it was stopped in the just-produced 3D fabric item. The arrangement for supplying CF for enabling continuous add-on weaving is a constituent of the add-on weaving process.

(g) Arrangement for Supplying Warp Yarns

The supply of warp yarns/tows is preferably obtained from individual sources such as bobbins and spools. They are preferably supported by the sub-framework so that they always have a direct and constant supply point for the shedding healds. Alternatively, the warp yarns' supply could be supported from outside of the sub-framework. The warp yarns for each set of healds can be either individually tensioned or collectively tensioned by commonly available tensioning devices. A clamp can be provided in desired orientation for holding the open ends of the warp yarns/tows if and when they are cut, for example when different cross-sections have to be produced and the yarns remaining in the spools can be further used to minimize yarn wastage. The arrangement for supplying warp yarns supported on the sub-framework is a constituent of the add-on weaving process.

(h) Means for Protecting CF

To prevent CF from getting damaged by the heald/s which touch its surface/s during shedding operation in certain situations, guards such as suitable thin sheets of metal, plastic, fabric, paper etc. could be used in either folding, curving or plain forms. Such a sheet material could be suitably placed and held between the CF's surface and the heald adjacent to it. Further, such a protective sheet material could be had either in stationary or mobile manner. The means for protecting CF is a constituent of the add-on weaving process.

(i) Program for Operating the Add-on Weaving Process

The various arrangements and means indicated for carrying out the add-on weaving process are suitably linked to each other for operation in required sequential steps by a suitable program. Such a program also takes into consideration the requirement of time for satisfactory performance of the different operational steps in accordance with the needs of the 3D fabric item under production. The program could be of either digital/electronic or mechanical or combination of both these types. Such an operational program is a constituent of the add-on weaving process.

Products of Add-on Weaving Process

Figure 14A:
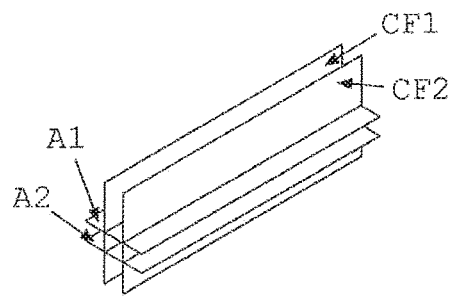
FIGS. 14a-14z exemplify different 3D fabric items producible by the add-on weaving process.
Figure 14B:
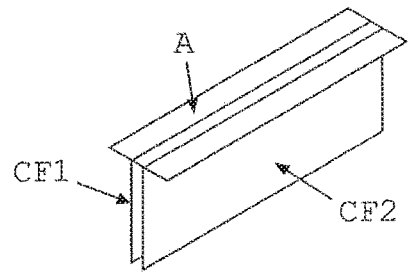
Figure 14C:
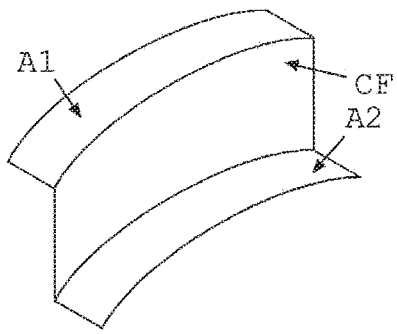

Having described sufficiently the necessary aspects of the add-on weaving process, it is pertinent to bring forward its versatility. Accordingly, in FIGS. 14a-14z are presented some examples of 3D fabric items that this novel add-on weaving process can produce using CF, warps and wefts. These examples also complement those already indicated earlier in reference to FIGS. 11a-11e. Through all these examples of 3D fabric items a person skilled in the art will immediately notice that an add-on weaving machine can be very versatile as essentially its shedding, weft inserting and advancing units can be variously employed through suitable orientations, manipulations and configurations to directly produce countless 3D fabrics items comprising either one or more CFs and either one or more interacting woven materials (A), which are woven using warp and weft yarns and simultaneously integrated to CF/s at any required place in a mutually through-thickness and intersecting manner. The important aspects/features of examples of 3D fabric items illustrated in FIG. 14 are highlighted here. Also, it will be apparent to a person skilled in the art that impregnation of such 3D fabric reinforcing items with required matrix material, whether synthesized, or natural or combination of them, such as resin, epoxy, thermoplastic, metal, ceramic, carbon, cement, concrete, amber, clay, slurry etc., will uniquely create a high performing and delamination resistant single-piece composite material not realized earlier.

FIG. 14a exemplifies a 'double-plus' cross-section profiled 3D fabric item composed of two webs CF1 and CF2, and two woven flanges (A1, A2). FIG. 14b shows a "Pi" cross-section profiled 3D fabric item wherein the web comprises two CFs (CF1, CF2) separated from each other and the flange (A) is woven. It may be noted that the part of flange between the two CF webs is also woven. In FIG. 14c is shown a "Z" (or "S") cross-section curved profile wherein the web CF is curved and the upper flange (A1) is woven in a curved form to the left side of web CF and the lower flange (A2) is woven in a curved form at the right side of the web CF.

Figure 14D:
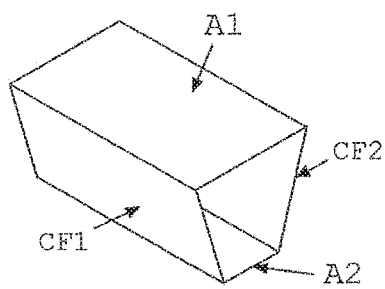
Figure 14E:
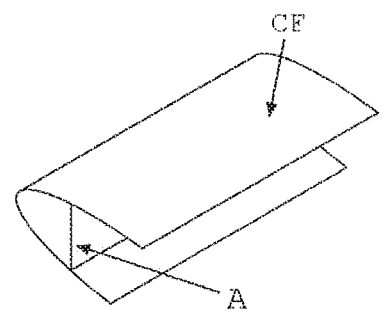
Figure 14F:
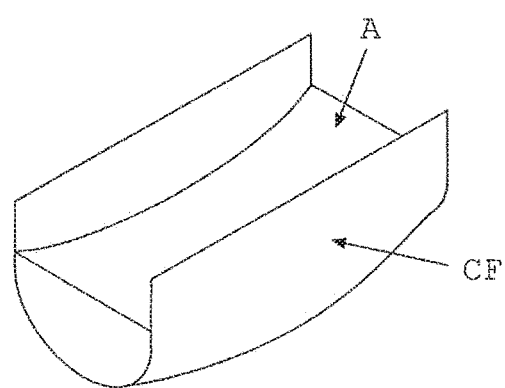

In FIG. 14d is shown a trapezoidal cross-section hollow 3D fabric item wherein left and right webs are composed of CF1 and CF2, which are not parallel to each other, and the top and bottom flanges (A1, A2) are woven parallel to each other. FIG. 14e shows a curving/bending or single-curvature CF for creating upper and lower flanges in continuous manner and their being connected to each other by the in-between linear woven web (A). Likewise in FIG. 14f is shown a CF, which has double-curvature, for creating left and right webs in continuous manner and their being connected by the in-between curving woven flange (A).

Figure 14G:
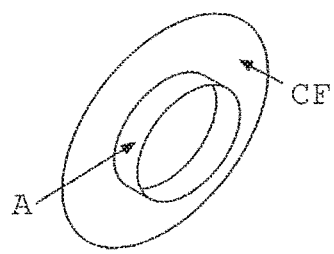
Figure 14H:
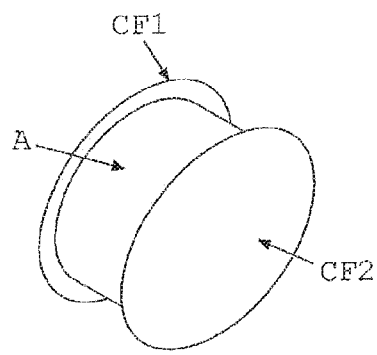

FIG. 14g shows a web CF that is circular and flat with a circular opening in its centre and a woven circular flange (A) projecting at the right side of the circular web and at the periphery of its circular opening. In FIG. 14h is shown a 3D fabric item comprising two distanced and parallel flat circular webs CF1, CF2 which are connected by woven flange (A) at a desired radial distance. In both these examples the woven material will have a starting-finishing joint. However, if required the woven flange (A) could be produced in a manner whereby weaving is continued a little more in a higher plane than the previous after reaching the starting position to achieve overlapping with the previously produced woven flange (A) which lies in relatively lower plane. This way an improved strengthening of flange and flange-web joint is achieved.

Figure 14I:
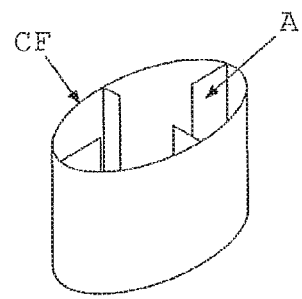
Figure 14J:
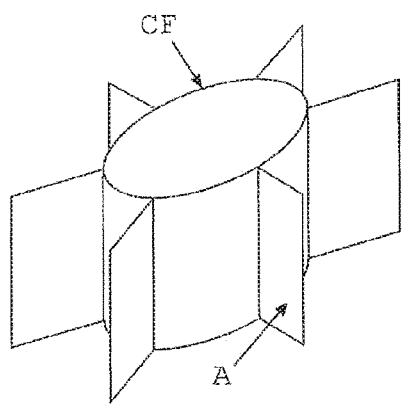

In the 3D fabric items shown in FIGS. 14i and 14j, the 'web' CF is tubular of either seamless or seamed types. 'Flanges' in the form of fins (A) are woven and connected to the tubular web CF. Whereas the woven fins (A) in FIG. 14i extend in radial direction from the inside wall of the tubular CF, in FIG. 14j the fins (A) extend in radial direction from the outer wall of the tubular CF.

Figure 14K:
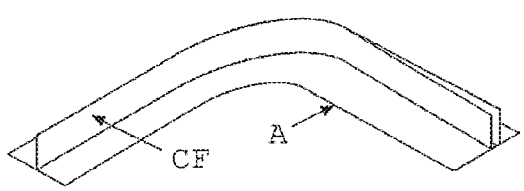
Figure 14M:
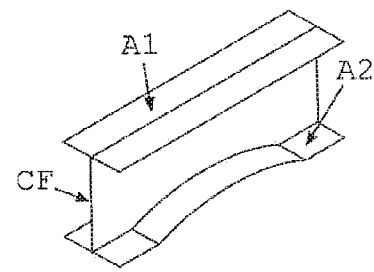

FIG. 14k shows a bending profiled 3D fabric item that has "T" cross-section at one end and "Pi" cross-section at the other end. Its web is composed of two bending CFs that are jointed at one end side to create "T" cross-section and separated at the other end side to create "Pi" cross-section. Flange (A) is woven in a correspondingly curving manner whereby incorporation of warp yarns in a corresponding curving orientation eliminates stress build-up. In FIG. 14m is shown an I cross-section profiled 3D fabric item with its web composed of CF. Whereas the top edge of web is linear, its bottom edge is a combination of linear and curving edges. The top and bottom flanges (A1 and A2) are correspondingly woven linear on top and linear-curving at bottom.

Figure 14N:
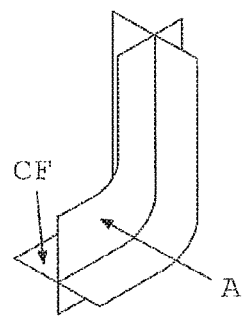
Figure 14P:
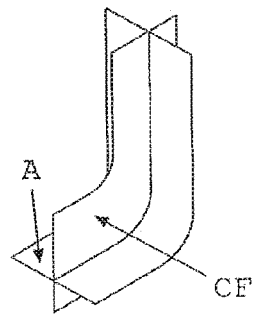

In FIG. 14n is shown a bending "+" cross-section profiled 3D fabric item. Its flange is composed of CF and the woven web (A) is produced at CF's front and back sides. In comparison, the bending "+" cross-section profiled 3D fabric item shown in FIG. 14p has its web composed of CF and the woven flange (A) is produced at CF's left and right sides.

Figure 14Q:
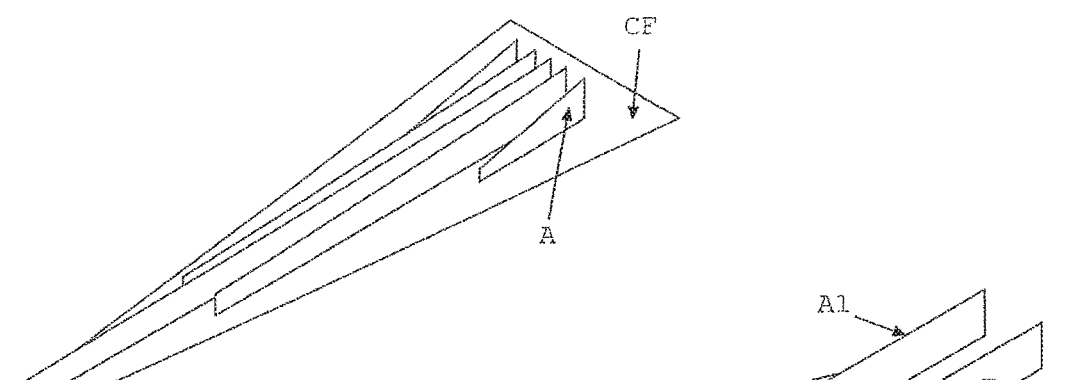
Figure 14R:
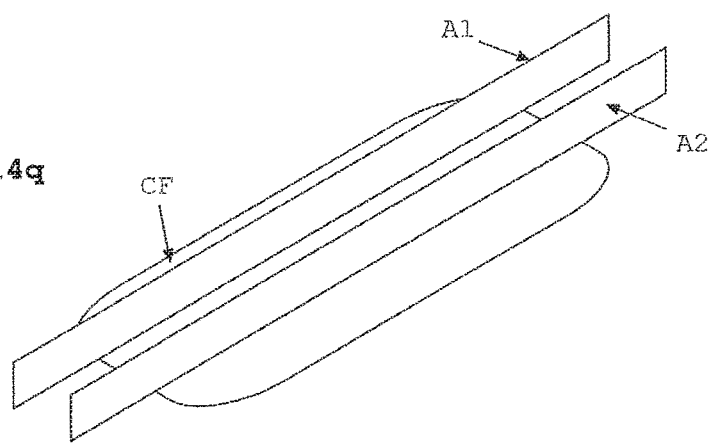

FIG. 14q shows a 3D fabric item composed of a shaped CF flange and multiple webs (A) projecting from the top surface of CF flange. Woven webs (A) are of suitable different lengths. Also, the shapes of the two outmost woven webs (A) are tapering and different from those in between them. In FIG. 14r is shown a 3D fabric item comprising a CF flange and parallel woven webs (A1 and A2) which have lengths greater than that of CF.

Figure 14T:
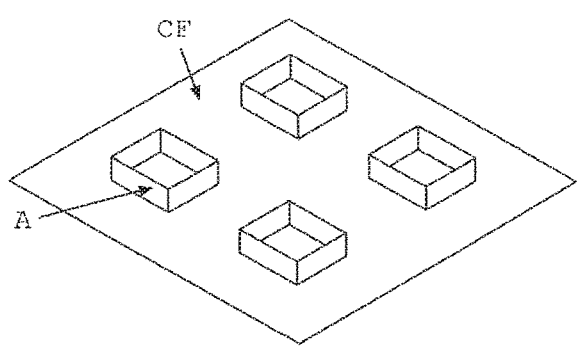
Figure 14S:
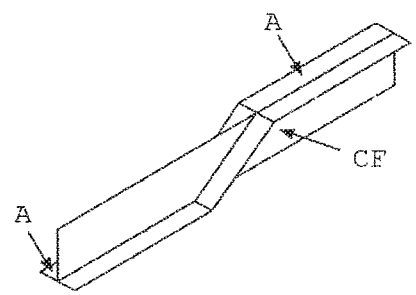
Figure 14U:
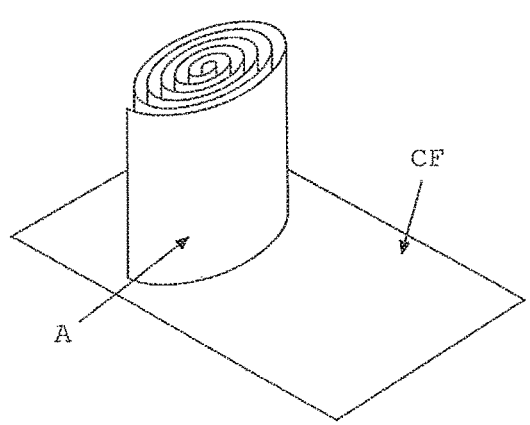

In FIG. 14s is shown a 3D fabric item that has relatively inverted "T" cross-sections at the two end sides. The web is composed of CF and the woven flange (A) continues from bottom edge side of CF to its top edge side. The segment of woven flange (A) connecting the bottom and top flanges could be had either in sloping/inclined way, as shown, or vertical. FIG. 14t shows a 3D fabric item comprising a CF flange of square shape and multiple webs that are square-like projections from the top surface of CF. The 3D fabric item shown in FIG. 14u comprises a flange CF and woven spiral web (A) projecting out from the top surface of flange CF.

Figure 14V:
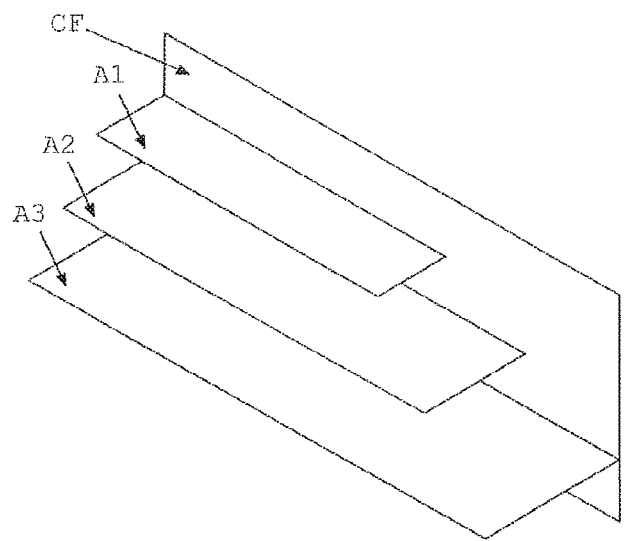
Figure 14X:
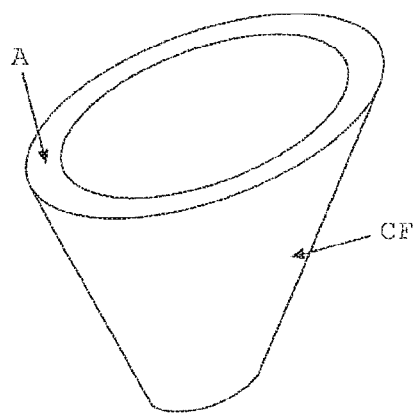
Figure 14W:
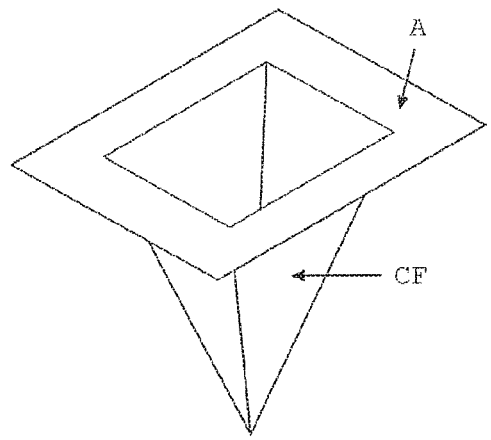

FIG. 14v shows a 3D fabric item comprising web CF and multiple woven flanges (A1, A2 and A3) projecting out from one surface of CF. These flanges are of unequal widths and lengths. In FIG. 14w is shown an inverted pyramid-like CF web and a woven flange (A) at the outer sides of its top edges. Similarly, in FIG. 14x is shown a cone-like CF web and a woven flange (A) at the inner side of its edge. The starting and finishing ends of each of the woven flanges shown in FIGS. 14w and 14x may or may not overlap with each other at a suitable place.

Figure 14Y:
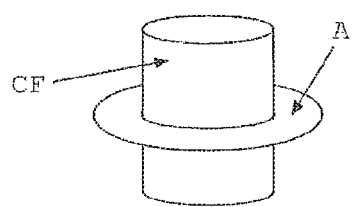
Figure 14Z:
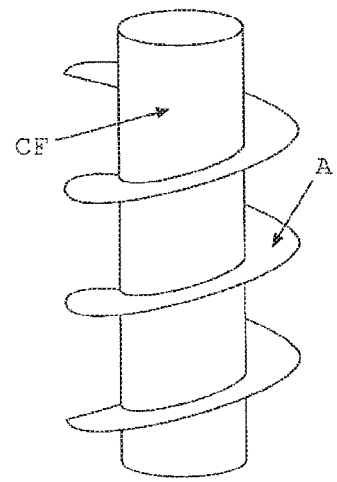

In FIG. 14y is shown a tubular CF, with or without seam, having a flange (A) woven at its outer surface at a required distance from one of its end sides. FIG. 14z shows a tubular CF, with or without seam, having helix-like woven flange (A), of required length and pitch, at its outer surface.

It will be obvious now to a person skilled in the art that a 3D fabric item could be also obtained by transforming or modifying a 3D fabric produced by the add-on weaving process. For example, as shown in FIG. 14-1, the lower web parts of the H cross-section profile, composed of two CFs, could be curved outwards to transform the H cross-section to a Pi cross-section that has the woven part (A) at its base while still connecting the two CFs which continuously curve from vertical to horizontal planes in respective directions. Likewise, as shown in FIG. 14-o, the top flange of an I cross-section profile, composed of woven material (A), could be turned upwards at an angle relative to the web CF to transform it into a cross-section of "Y" shape with a horizontal base. Transformation of one cross-sectional shape to another could be also achieved by cutting off a certain part of a 3D fabric item. For example, the web of an "I" cross-section profiled beam-like 3D fabric item could be cut longitudinally in the middle to obtain two "T" cross-section profiled 3D fabric items. Likewise the segment of the web of a "+" cross-section profiled beam-like 3D fabric item, which projects over the surface of the flange, could be cut off to obtain a "T" cross-section profiled 3D fabric item. Such selective cutting of either the flange or the web or both these of a 3D fabric item produced by the add-on weaving process will not impair the structure, and hence performance, of the created new 3D fabric item because the through-thickness integrity of the intersecting web and flange will still be maintained.

Similarly, depending on application requirements a composite material comprising 3D fabric item produced by the described novel add-on weaving process could be machine cut to convert one form of product into a product of another form. The resistance to delamination due to the through-thickness integrity of intersecting web-flange will render the composite material product more reliable than possible by use of existing textile reinforcements.

Modification Possibilities

The described add-on weaving process devised for producing 3D fabric items using CF, warp yarns and weft yarns can be modified in many different ways without deviating from its spirit. For example, in situations where only one interacting woven layer is required to be produced traditional healds could be employed at one or both face sides of CF for displacing warp yarns for shedding. In this case the shed will be created in line with the plane of fabric being woven. Also, along with use of traditional healds, the beating-up reed could be suitably modified and used.

Some of the operational steps described earlier could be altered, such as the sequences for forming different sheds, using different types of needles for inserting wefts, and inserting wefts in relatively unequal spacing between different woven layers through variable advancing of either fabric or the joint shedding and weft inserting units in the sub-framework. It is also possible to use only one joint shedding and weft inserting unit to build a 3D fabric item layer by layer, though this will be inefficient, time consuming and uneconomical. However, when producing a spiral-like woven construction, use of one joint shedding and weft inserting unit would be advantageously necessary.

The healds in the shedding unit could be mounted on a shaft that is expandable-contractible within limits to spread out and bring closer the warp yarns during weaving to create a woven fabric wherein the warp yarns are not incorporated linearly but, for example, in sine-curve manner. It is also possible that different layers of woven fabrics are created with relatively different weave patterns, different fibers, and different fiber orientations.

Figure 15A:
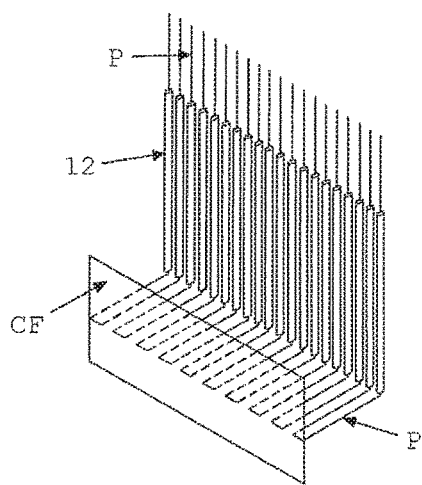
FIGS. 15a-15g exemplify further employment of add-on weaving method to create other types of 3D fabric items.
Figure 15B:
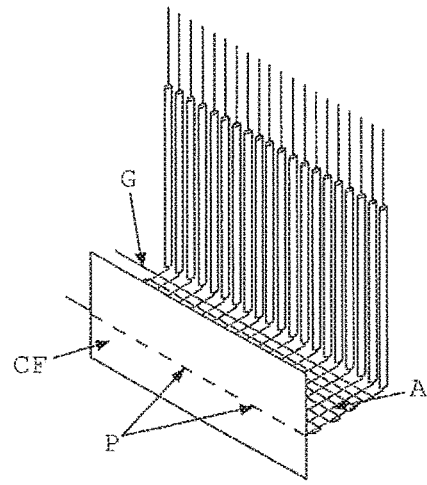
Figure 15C:
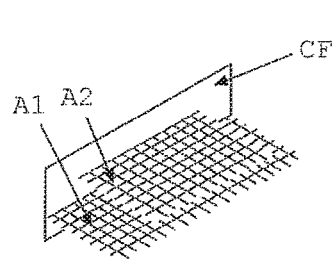

The described add-on weaving process should not be considered limited to its ability to connect the interacting woven material being produced to CF by only wefts. Warp yarns (P) of specific length could be first threaded through suitably clamped CF in preferably a loop form for reliable connection and then passed through the described pipe-like healds (12) as shown in FIG. 15a. The ends of these warp yarns, which emerge from the top of pipe-like healds (12), could be held by a suitable arrangement so that the warp yarns get released or fed for weaving to progress. Through such a warp set-up, wherein one end of warp yarns is connected to CF, novel 3D fabric items can be produced by weaving these warp yarns (P) with weft yarn (G) to produce woven fabric (A) as shown in FIG. 15b. It may be mentioned here that either one or more sheets of warp yarns could be used. When using more than one sheet of warp yarns, such sheets could be either parallel or perpendicular or at a suitable angle to each other. The weft yarns can weave with the warp yarns of each of the sheets. FIG. 15c shows two parallel woven fabrics (A1 and A2) attached to CF.

Figure 15D:
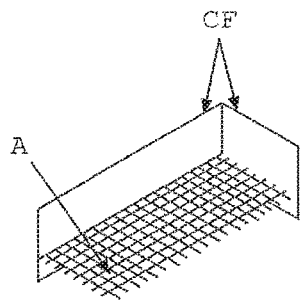
Figure 15E:
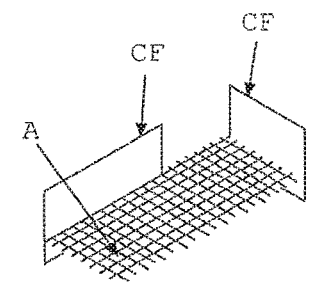
Figure 15F:
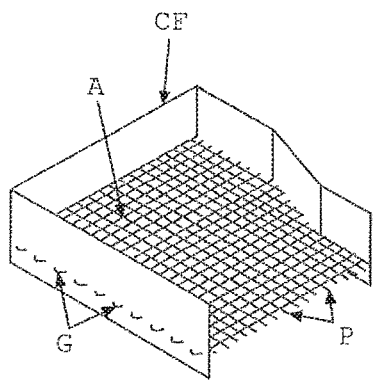

The weft yarns can be connected to either the same CF which is bent 90°, as shown in FIG. 15d, or connected to a separate CF as shown in FIG. 15e. When producing a 3D fabric item of enclosure-like irregular shape, as exemplified in FIG. 15f, the warp yarns (P) connected with CF at one end could be selectively brought into play/action and taken away/disabled/cut in suitable steps/sequences to create a shaped 3D fabric item in which both warps (P) and wefts (G) interlace to create interacting woven fabric (A) and these yarns are also connected to the same CF which is bent at an angle, or curving, according to required shape during weaving. It may be noted that in this case the warp yarns will not pass directly through the segment of CF that is bent/curving relative to the segment of CF through which warp yarns are first connected by threading in a loop form. Depending on the shape of 3D fabric item to be produced and other requirements, the warp yarns concerned would have to be sequentially drawn out from the pipe-like healds, threaded through the bending/curving segment of CF at desired positions, re-threaded through the pipe-like healds, and further weaving recommenced/continued.

Figure 15G:
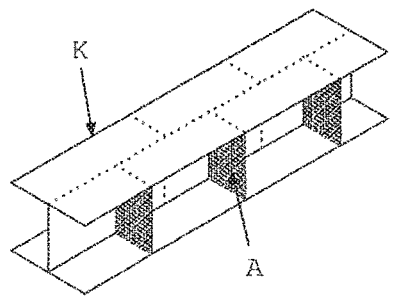

The described manner of connecting warp and weft yarns to a CF could be extended to produce a 3D fabric item using a pre-produced 3D fabric item according to present invention as a CF in a second step. For example, as shown in FIG. 15g, the pre-produced 3D fabric item (K) in the form of an I cross-section beam could be as well used as a new CF. By passing warp yarns through its web and interlacing them with wefts which pass through the flanges as described in the foregoing, a new interacting woven fabric (A) will be produced connected with the web and flanges of the I-beam as shown to result in a new 3D fabric item. Such a structure will further improve the performance and reliability of the composite material I-beam.

Further, by virtue of supporting the sub-framework on a robot or stationary column, it becomes possible to perform weaving in different orientations as the shedding and weft inserting units are part of the sub-framework. It also becomes possible to perform weaving by using more than one sub-framework each of which is suitably supported by either one common or individual columns and arranged in a non-interfering manner. This way either one or more number of shedding units of suitable designs, configurations and engineered constructions can be employed in different combinations and orientations relative to CF and speed up production.

Apart from employing more than one shedding unit in mutually parallel configuration and arranged in series they could be also employed in mutually perpendicular configurations whereby different sheds in corresponding orientations can be created. Insertions of wefts in these sheds will result in production of independent woven fabrics that are also mutually perpendicular to each other. For example, weaving ribs for stiffening both walls of an L-shaped CF. Needless to mention, more than one shedding unit could be also arranged in any desired mutual angle to produce corresponding 3D fabric items. A skilled person in the art will understand now that more than one sub-framework, each independently comprising its respective shedding and weft inserting units, could be either commonly supported by one support or individually supported by different supports and moved in a gyrating configuration through suitable drives whereby complex contoured 3D fabric items could be also produced.

From the disclosed detailed description of the essential aspects and embodiments of the inventions relating to novel add-on weaving method and device, 3D fabric items thereof, and composite materials incorporating 3D fabric items producible by add-on weaving process it will be obvious now to a person skilled in the art that these can be modified or adapted in many different ways. Such changes will not alter and limit the spirit and scope of these inventions which are listed in the Claims below.

The invention claimed is:

1. A three-dimensional fabric item comprising at least one complementary fabric and at least one interacting woven fabric, wherein the complementary fabric is a pre-produced, in itself structurally stable, fabric, and wherein the interacting woven fabric comprises interlaced warps and wefts, wherein at least some of the warps and/or wefts of the interacting woven fabric penetrate through the complementary fabric in the thickness direction, whereby the complementary fabric and interacting woven fabric are connected to each other at their intersecting junction forming a three-dimensional fabric item, wherein at least one complementary fabric and at least one interacting woven fabric have relatively different structural architectures, the structural architecture of said at least one interacting woven fabric being individual single woven layer(s) and the structural architecture of said at least one complementary fabric comprising at least one of: woven 2.5D fabric, woven 3D fabric, knitted, braided, any type of non-woven, laced, embroidered, non-crimp fabric (NCF), unidirectional, net and pile type fabric.

2. The three-dimensional fabric item of claim 1, wherein said item is in the form of a profiled cross-section beam wherein its constituent complementary fabric is either its web or flange and its constituent interacting woven fabric is correspondingly either its flange or web.

3. The three-dimensional fabric item of claim 1, wherein said item is in a form other than that of a profiled cross-section beam, wherein its constituent complementary fabric is one of the members or sections or components or parts, and its constituent interacting woven fabric is the other member or section or component or part of the three-dimensional fabric object.

4. The three-dimensional fabric item of claim 1, comprising at least a combination of two complementary fabrics.

5. The three-dimensional fabric item of claim 4, wherein said at least two complementary fabrics both are penetrated by warps and/or wefts of a common interacting woven fabric.

6. The three-dimensional fabric item of claim 1, comprising a combination of at least two interacting woven fabrics.

7. The three-dimensional fabric item of claim 1, wherein at least one interacting woven fabric extends from both face sides of a complementary fabric.

8. The three-dimensional fabric item of claim 1, wherein at least one interacting woven fabric either extends between two walls of individual separated complementary fabrics or two walls of a single curving complementary fabric.

9. The three-dimensional fabric item of claim 1, wherein at least one of the complementary fabric(s) is at least one of uniaxial, biaxial, triaxial, quadaxial, and multiaxial type.

10. The three-dimensional fabric item of claim 1, wherein at least one of the complementary fabric(s) is in at least one of flat configuration and shaped configuration, or in a combination of these configurations.

11. The three-dimensional fabric item of claim 1, wherein at least one of the complementary fabric(s) forms at least one of a solid, a shell, a hollow, and a solid with openings, or a combination of these types.

12. The three-dimensional fabric item of claim 1, wherein two or more adjacently occurring complementary fabrics and/or interacting woven fabrics are connected to each other by additional fastening, said additional fastening preferably being at least one of sewing, stitching, stapling, bonding, fusing and pinning.

13. A method for producing a three-dimensional fabric item comprising at least one complementary fabric and at least one interacting woven fabric interacting in a mutual through thickness manner, said method comprising the steps:

providing at least one pre-produced, in itself structurally stable, complementary fabric; and weaving at least one interacting woven fabric by interlacing warps and wefts, wherein at least some of the warps and/or wefts penetrate through the complementary fabric, whereby the interacting woven fabric and complementary fabric are connected to each other at their intersecting junction forming a three-dimensional woven fabric item, wherein at least one complementary fabric and at least one interacting woven fabric have relatively different structural architectures, the structural architecture of said at least one interacting woven fabric being individual single woven layer(s) and the structural architecture of said at least one complementary fabric comprising at least one of: woven 2.5D fabric, woven 3D fabric, knitted, braided, any type of non-woven, laced, embroidered, non-crimp fabric (NCF), unidirectional, net and pile type fabric.

14. The method of claim 13, wherein a set of two or more architecturally similar or different individual complementary fabrics are provided.

15. The method of claim 13, wherein the at least one provided complementary fabric is held with at least one of its face sides facing in the direction of the warp yarns of said interacting woven fabric.

16. The method of claim 13, wherein the provided complementary fabric is held with its face sides perpendicular to or at an angle to the weft insertion directions of said interacting woven fabric(s).

17. The method of claim 13, wherein the weaving step comprises the steps of:

forming sheds by displacing the warp yarns in a direction other than the thickness direction of the interacting woven fabric being produced;

inserting wefts into said sheds and penetrating through said complementary fabric; and packing the inserted wefts at fabric fell position using at least some of the warp yarns displaced for shedding.

18. The method of claim 13, wherein the weaving of the interacting woven fabric comprises forming the shed facing in the direction of the complementary fabric to direct the insertion of weft for penetrating through the complementary fabric perpendicularly or at an angle relative to the surface of the complementary fabric.

19. The method of claim 13, wherein the steps of shedding and weft inserting are performed at a mutually constant positional relationship.

20. The method of claim 13, wherein weaving of woven fabric comprises forming sheds simultaneously at two face sides of the complementary fabric to form interacting woven fabric that extends on both said face sides of said complementary fabric.

21. The method of claim 13, wherein the provided complementary fabric is held stationary about an axis or held intermittently stationary and intermittently turned about an axis during weaving.

22. The method of claim 13, wherein the weaving step further comprises the step of maintaining a constant width of the produced interacting woven fabric.

23. An apparatus for producing a three-dimensional fabric item comprising at least one complementary fabric and at least one interacting woven fabric, said apparatus comprising:

a holder or clamping arrangement for holding a pre-produced, in itself structurally stable, complementary fabric;

a weaving system for weaving an interacting woven fabric by interlacing warps and wefts, wherein at least some of the warps and/or wefts penetrate through the held complementary fabric in the thickness direction, whereby the complementary fabric and interacting woven fabric are connected to each other at their intersecting junction forming a three-dimensional woven fabric item, wherein at least one complementary fabric and at least one interacting woven fabric have relatively different structural architectures, the structural architecture of said at least one interacting woven fabric being individual single woven layer(s) and the structural architecture of said at least one complementary fabric comprising at least one of: woven 2.5D fabric, woven 3D fabric, knitted, braided, any type of non-woven, laced, embroidered, non-crimp fabric (NCF), unidirectional, net and pile type fabric.

24. The apparatus of claim 23, wherein the holder or clamping arrangement comprises clamps for holding the complementary fabric during weaving.

25. The apparatus of claim 23, wherein the holder or clamping arrangement is arranged to hold the complementary fabric stationary about an axis or to hold the complementary fabric intermittently stationary and intermittently turned about an axis during weaving.

26. The apparatus of claim 23, wherein the weaving system comprises:

a shedding arrangement for forming sheds by displacing the supplied warp yarns in a direction other than in the thickness direction of the interacting woven fabric being produced;

a weft inserting arrangement for inserting weft yarns into said sheds and penetrating through the complementary fabric;

an advancing arrangement for enabling formation of successive shed and insertion of successive weft.

27. The apparatus of claim 23, wherein the shedding arrangement comprises a plurality of shedding units, each shedding unit being able to produce an individual interacting woven fabric layer to integrate with the complementary fabric.

28. The apparatus of claim 23, wherein at least one shedding unit in the shedding arrangement is movable in one or more planes to enable production of a corresponding number of individual interacting woven fabrics that are relatively parallel or non-parallel to each other and parallel or non-parallel to an edge of the complementary fabric.

29. The apparatus of claim 23, wherein two or more shedding units in the shedding arrangement face in same direction or at an angle to each other or oppositely.

30. The apparatus of claim 23, wherein the orientation of the shed formed by the shedding arrangement is perpendicular or at an angle relative to the face of the complementary fabric to correspondingly direct the insertion of weft through complementary fabric.

31. The apparatus of claim 23, wherein a shedding unit comprises at least one heald for displacing an individual warp for enabling weaving between said warp yarn and the complementary fabric.

32. The apparatus of claim 31, wherein the shedding arrangement allows the complementary fabric to pass between its healds.

33. The apparatus of claim 23, wherein the weft inserting arrangement inserts the wefts as singles or doubled/folded through the shed and penetrates through the complementary fabric perpendicularly or at an angle relative to the surface of the complementary fabric.

34. The apparatus of claim 23, wherein the shedding arrangement and the weft inserting arrangement are moveable and have a constant positional relationship.

35. The apparatus of claim 23, wherein the advancing arrangement is arranged to support the shedding and weft inserting units to traverse and guide them in linear or angular or curving or circular or suitable combination of these paths to facilitate formation of successive sheds and insertion of successive wefts for enabling uniform/consistent production of the required 3D fabric item.

36. The apparatus of claim 23, wherein a clamping arrangement is further included in the weaving system for maintaining a constant width of the produced interacting woven fabric.

37. A composite material reinforced with a three-dimensional fabric item according to claim 1.

* * * * *